United States Patent
Glazer et al.

(10) Patent No.: US 7,627,810 B2
(45) Date of Patent: Dec. 1, 2009

(54) MODEL FOR CREATING, INPUTTING, STORING AND TRACKING MULTIMEDIA OBJECTS

(75) Inventors: David Glazer, Woodside, CA (US); Keith Deutsch, Palo Alto, CA (US); Ronald Schneider, Boulder, CO (US); Leonard Karpel, Lyons, CO (US); Michael Nordman, Mountain View, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 09/942,161

(22) Filed: Aug. 29, 2001

(65) Prior Publication Data

US 2002/0129052 A1    Sep. 12, 2002

Related U.S. Application Data

(60) Provisional application No. 60/228,853, filed on Aug. 29, 2000.

(51) Int. Cl.
G06F 15/00    (2006.01)

(52) U.S. Cl. .............. 715/203; 715/201; 715/202; 707/104.1

(58) Field of Classification Search ......... 715/511–512, 715/501.1, 500.1, 515, 750–751, 201–205, 715/234; 345/750, 751; 707/104.1
See application file for complete search history.

(56) References Cited

U.S. PATENT DOCUMENTS

| | | | |
|---|---|---|---|
| 5,640,560 A * | 6/1997 | Smith | 707/104.1 |
| 5,689,641 A * | 11/1997 | Ludwig et al. | 709/241 |
| 5,974,446 A | 10/1999 | Sonnenreich et al. | 705/14 |
| 5,978,648 A | 11/1999 | George et al. | 434/362 |
| 6,081,788 A | 6/2000 | Appleman et al. | 709/204 |
| 6,085,184 A | 7/2000 | Bertrand et al. | 706/45 |
| 6,088,702 A * | 7/2000 | Plantz et al. | 707/103 R |
| 6,105,055 A | 8/2000 | Pizano et al. | 709/204 |
| 6,188,396 B1 | 2/2001 | Boezeman et al. | 715/500.1 |
| 6,201,948 B1 | 3/2001 | Cook et al. | 434/350 |
| 6,263,486 B1 * | 7/2001 | Boezeman et al. | 717/108 |
| 6,355,909 B1 | 3/2002 | Griffiths et al. | 219/403 |
| 6,408,315 B1 | 6/2002 | McManus et al. | 715/500.1 |
| 6,430,582 B1 | 8/2002 | Duncombe | 715/500.1 |
| 6,507,726 B1 | 1/2003 | Atkinson et al. | 434/350 |
| 6,546,405 B2 * | 4/2003 | Gupta et al. | 715/512 |
| 6,584,480 B1 * | 6/2003 | Ferrel et al. | 715/513 |
| 6,636,238 B1 | 10/2003 | Amir et al. | 715/730 |
| 6,640,238 B1 * | 10/2003 | Bowman-Amuah | 709/201 |
| 6,683,649 B1 | 1/2004 | Anderson | 348/333.05 |

(Continued)

OTHER PUBLICATIONS

"Getting Results with Microsoft Office 97", Microsoft 1997, pp. 628-630.*

(Continued)

*Primary Examiner*—Cesar B Paula
(74) *Attorney, Agent, or Firm*—Winston & Strawn LLP

(57) ABSTRACT

The invention includes structures and schema for organizing and inter-relating objects, data, or files, including relational, network, hierarchical, and entity-relationship models, among others, that are dynamic, that is changing with time. This includes manipulating structures by conversion, compression, compaction, and compilation, for various purposes. Also included is generating structures for storing, organizing, and managing dynamic objects for retrieval and presentation.

60 Claims, 15 Drawing Sheets

EDIT SLIDE SCREEN

U.S. PATENT DOCUMENTS

| | | | |
|---|---|---|---|
| 6,694,482 B1 | 2/2004 | Arellano et al. | 715/500.1 |
| 6,728,784 B1* | 4/2004 | Mattaway | 709/245 |
| 6,738,075 B1 | 5/2004 | Torres et al. | 715/723 |
| 6,738,078 B1 | 5/2004 | Duncombe | 715/761 |
| 6,789,228 B1 | 9/2004 | Merril et al. | 715/500.1 |
| 6,792,573 B1 | 9/2004 | Duncombe | 715/500.1 |
| 6,807,535 B2* | 10/2004 | Goodkovsky | 706/3 |
| 6,823,490 B1* | 11/2004 | Dauerer et al. | 715/513 |
| 6,834,371 B1 | 12/2004 | Jensen et al. | 715/500.1 |
| 2001/0033296 A1 | 10/2001 | Fullerton et al. | 715/730 |
| 2002/0010926 A1* | 1/2002 | Lee | 725/40 |
| 2002/0154210 A1* | 10/2002 | Ludwig et al. | 348/14.08 |

OTHER PUBLICATIONS

"Getting Results with Microsoft Office 97", Microsoft, 1997, pp. 523.*

Chiu et al, "NoteLook: taking notes in meetings with digital video and ink", ACM, pp. 149-158, 1999.*

M. C. Buchanan et al., "Specifying Temporal Behavior in Hypermedia Documents," Information Sciences and Technologies Laboratory 12 pgs.

W.E. Mackay et al., "Virtual Video Editing in Interactive Multimedia Applications," Communications of the ACM, vol. 32, No. 7, pp. 802-818. Jul. 1989.

S. Gibbs et al., "Data Modeling of Time-Based Media," Time-Based Media, pp. 1-21.

L.A. Rowe et al., "A Continuous Media Player," Proc. $3^{rd}$ Int. Workshop on Network and OS Support for Digital Audio and Video, San Diego, CA (Nov. 1992), 11 pgs.

T.D.C. Little, "Synchronization and Storage Models for Multimedia Objects," IEE Journal On Selected Areas In Communications, vol. 8, No. 3 (Apr. 1990), p. 413-427.

S. Wirag et al., "TIEMPO: An Authoring and Presentation System for Interactive Multimedia," pp. 1-15.

K. Yoon et al., "TOCPN: Interactive Temporal Model for Interactive MultimediaDocuments," 9 pgs.

H.M. Vin et al., "System Support for Computer Mediated Multimedia Collaborations," 7 pgs.

Supplementary European Search Report dated Mar. 17, 2009, 01968235.0-2413/1323054 PCT/US0126917.

Shih-Fu Chang et al., XP011044010 "Next-Generation Content Representation, Creation, and Searching for New-Media Applications in Education", Proceedings Of The IEEE, vol. 86, No. 5, May 1998.

Victor O. K. Li, et al., XP011043869, "Distributed Multimedia Systems", Proceedings of the IEEE, vol. 85, No. 7, Jul. 1997.

Greg Kaestle et al., XP010348747"Sharing Experiences from Scientific Experiments", Scientific and Statistical Database Management pp. 168-177 (1999).

Catherine E. Chronaki et al., XP011028285, "WebOnCOLL: Medical Collaboration in Regional Healthcare Networks", IEEE Transactions on Information Technology in Biomedicine, vol. 1. No. 4. pp. 257-269Dec. 1997.

* cited by examiner

TALK VIEW SCREEN (NEW) (OUT-OF-TIME VIEW)

EDIT SLIDE SCREEN

FIG. 4 NEW OBJECTS - POLL OBJECT - NEW/EDIT SCREEN

VOTE SCREEN (SINGLE CHOICE)

VOTE SCREEN; MULTIPLE CHOICE

POLL RESULTS SCREEN; SINGLE CHOICE

POLL RESULTS SCREEN; MULTIPLE CHOICE

SHORTCUT OBJECT - CREATE SHORTCUT SCREEN

SELECT SHORTCUT TARGET SCREEN

US 7,627,810 B2

MODEL FOR CREATING, INPUTTING, STORING AND TRACKING MULTIMEDIA OBJECTS

PRIORITY

This application claims the benefit of U.S. Provisional Application No. 60/228,853 filed Aug. 29, 2000, which provisional application is hereby incorporated by reference in its entirety.

FIELD OF THE INVENTION

The invention relates to methods, systems, apparatus and content models for the creation, management, storage, and presentation of dynamic objects, as exemplified by, but not limited to streaming audio and streaming video.

BACKGROUND OF THE INVENTION

There is a continuing need to facilitate collaboration and interaction among individuals who may be widely separated by distance, time, or both. A 'rich media' format, delivered instantaneously via the Internet or corporate intranets, enables organizations of all sizes to communicate quickly and effectively with customers, partners and employees. Fast, effective communications drives top-line revenue, streamlines business processes, and lowers cost.

The method, system, and apparatus of the present invention provides the ability to organize, enrich, and leverage existing and future rich media content, including streaming content.

SUMMARY OF THE INVENTION

The invention relates to methods, systems, apparatus and content models for the creation, management, storage, and presentation of dynamic objects, as exemplified by, but not limited to streaming audio and streaming video. The methods, systems, and apparatus are built upon a content model for rich media formats, that is, media formats adapted to dynamic, time changing objects or time based content models.

The content model provides a hierarchy of views for the same content. Thus, one view might be an "in time" view where objects are presented in time order, while another view may be an "out-of-time" with the objects shown as for editing, the content model supporting a number of different view structures. h The content model provides a hierarchy of objects, with a container object at the top, as a "Talk Folder" object, and a plurality of time-based objects, called element objects, in the container object. The individual element objects have properties, in the OOP sense, such as start time, end time, and linked documents. The linked documents are logical functions, such as audio-visual objects or elements, transcript objects or elements, and graphics objects or elements. These objects or elements, themselves, have associated detailed characteristics such as a construction or build, type data, bandwidth detail, JavaScript details, and track objects. The next levels down in the hierarchy are those things that will actually play. The track object builds in a time view, parses the objects, and builds the page.

DETAILED DESCRIPTION OF THE INVENTION

Figure 1:
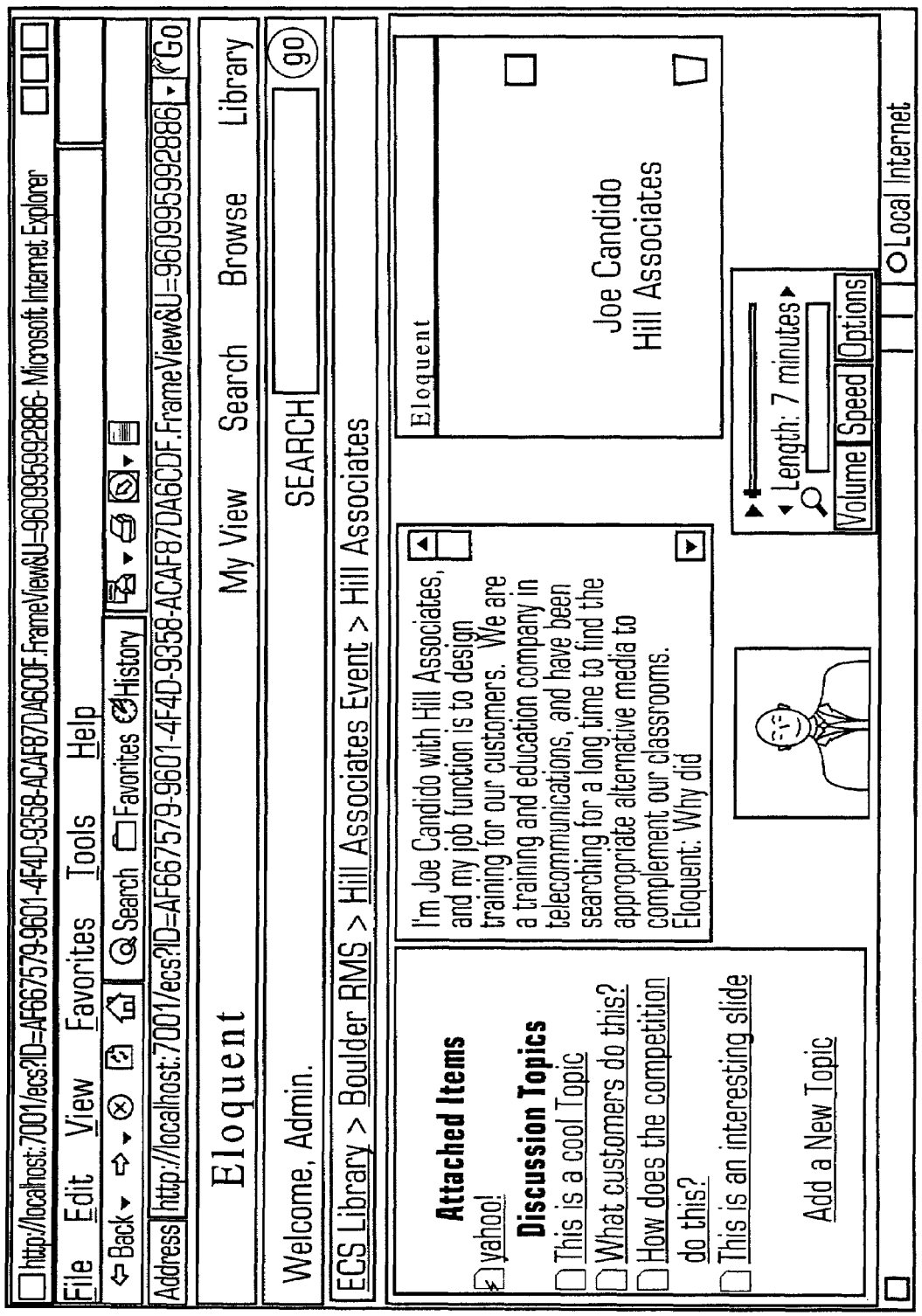
FIG. 1 is a screen shot of an in-time view of a talk-play screen.

The method, system, and apparatus of our invention provides total management, storage, searching, calling, and delivering of time dependent rich media content. Specifically, the invention utilizes time dependent objects and time dependent object management systems using a defined object model, and utilizing rich media, that are capable of real time interactions. One exemplary form of rich media is streaming media. A further aspect of the invention is the Management of Time Dependent Objects, with the method, system, and apparatus of the invention assembling time based objects on the fly, in real time, for delivery to a browser or client. Exemplary is a rich media player receiving and presenting pages on the fly from media objects.

The method, system, and apparatus of the invention includes a scalable software platform that manages, delivers and enriches all forms of rich media and streaming content for various end user applications. It accomplishes this by converging streaming media, documents, graphics, Web links and other communications content into a personalized, interactive and extensible communications format.

The server, data structure, and object model of the method, system, and apparatus described herein provide:

Central management of all streaming and rich media content. This is accomplished through central organization, management and delivery of all streaming and rich media content, including Eloquent, Microsoft Windows Media, Real Networks, and QuickTime formats.

Built-in profiling and personalization technology that enables users to push relevant information to individuals and groups as well as to request that certain types of information be automatically delivered to them. Library and category views offer users more structured views of all the content. Comprehensive search functionality enables users to find content ad-hoc, either through a powerful full-text search capability or alternatively by specific metadata types, such as author, organization and time.

The method, system, and apparatus described herein provide a User Interface that is both pleasing and functional within a standard Web-based (browser) paradigm. The four access points into the method, system, and apparatus of the invention are: My View, Search, Browse and Library.

The My View section includes the following categories:

a. Favorites—frequently used files or folders, personally selected by the individual user and displayed in a library-type view.
b. Subscriptions—content types selected by the user to be automatically be added or updated.
c. Recommendations—content delivered to the user by someone else in the system based on his/her profile.

The Search section enables users to perform a full-text search of content or to search for content based on metadata such as author, date, time, etc.

The Browse section provides categories by subject matter categories.

The Library section presents all the content in the system organized in a typical folder hierarchy.

The data structure, the metadata, and the set of graphical user interfaces facilitate end-user interactivity and provide an extensible framework for working with rich media, including streaming media. In this way, rich format content, including streaming media, go from being the end-solution, to becoming the starting point for collaborative, ongoing communications that grows in value as more users view the content and interact with it. This new framework enables users to add threaded discussions, documents, URLs, polls, and other communications content to existing streaming and rich media, enhancing the overall communication.

Attached Items and Discussion Topics: One embodiment of our invention provides a graphical user interface panel called: Attached Items and Discussion Topics. Documents, polls, shortcuts and links to other content (URLs) can be added and synchronized in the Attached Items section, while topics of interest about the content can be added in the Discussion Topic area. The user decides when the attached content should appear—and disappear. The user can also decide whether it is mandatory that the viewer read a document or participate in a discussion or Poll before continuing through the presentation.

Polls: Polls can be used to survey a site's viewing audience. Anyone with appropriate permissions can set up a poll and link it to a specific part of a presentation. Results can be made public or restricted, depending on the permissions set by the author.

Shortcuts: A shortcut is a pointer or reference to another item in the system. Shortcuts are useful to reference objects and items that physically exist in another place on the network.

A further aspect of the method, system, and apparatus of our invention is enterprise-level security and access control. The system, method, and apparatus centrally manage enterprise-wide access. Access controls include single user login to access any information that authorized users can view, alter or create content, and secure extranet access for remote users, suppliers and customers.

A still further aspect of the invention is enterprise scalability.

The method, system, and apparatus of our invention manages and delivers all forms of streaming and rich media content, including Eloquent, Microsoft Windows Media, Real Networks, and QuickTime formats.

In a preferred embodiment of our invention, the system, method, and apparatus are all completely standards-based and require only a browser on the desktop. To be understood, however, is that all streaming formats—including Microsoft Windows Media and Real Networks—require that a 'player' be installed on the client side in order to deliver that content.

The rich media and rich media management features of the method, system, and apparatus provide dynamic and collaborative communications. Communications are dynamic. Every good presenter knows this. In addition, communications in business is inherently collaborative. The audience adds to the value of the communication with questions, updates and ideas related to the topic. The method, system, and apparatus of our invention not only effectively deliver content to large audiences; it also facilitates and captures the interactive information sharing that naturally occurs in conjunction with those presentations.

By simply communicating, users create content that adds to the richness of the experience. Streaming media becomes rich. And rich media becomes richer. This interaction builds collective intelligence and increases the value of the content over time.

The data structure and object structure of the method, system, and apparatus of our invention begins with a "folder." Folders are logical 'containers' that are used to organize communications and content according to any criteria that the user desires. Information in a folder can be organized by topic, by date, by intended audience, or simply at random. Users can set permissions on folders that by default will pertain to the content contained in them unless the individual items are given different permissions. Folders appear in the Library section.

The objects contained in the container "Folder" can be viewed in various ways or views. One such view is the "overview" The overview function allows users to quickly see how time-based content such as streaming media is organized over time. The overview presents thumbnails of key 'scenes' of the streaming presentation—defined by the slides in the presentation for most business presentations. It then shows which additional communications content (transcript, documents, URLs, polls, etc.) is associated with those scenes. It also lists the start and end times for all elements of the communication.

The overview function enables content owners to easily review, edit and maintain a piece of rich media content. It gives users a convenient way to find and edit attachments and permissions associated with a presentation.

Another aspect of the rich format media of the invention is a threaded discussion. A threaded discussion is a shared text file that enables multiple users to post text-based comments in a common viewed format. Individual users can follow a 'discussion' among group members over time, can comment on individual parts of the conversation, and can begin new 'side conversations' or threads.

Unlike email, where a user might get many similar responses on the same topic because no one knows who else has responded to the original mail, a threaded discussion enables participants to see who else has added to the discussion—and what they said—in real time. This enables a widely dispersed group to have an electronic conversation that is both more natural and more useful than email.

Scalability is provided through a wide range of configuration options designed to fit any corporate or other user requirement. The system's Java Application Server uses clustering technology to grow capacity as large as the user base requires. Databases can be run locally or can be configured to run remotely. Remote databases can include supported enterprise databases running on the UNIX operating system. Finally each media server (Eloquent, Microsoft Windows Media, Real Networks, and QuickTime) can be operated independently and scaled to support the requirements for streaming media capacity.

The method, system, and apparatus of the invention are readily customizable, for example, through the use of customizations and third-party applications. This is the result of a completely object based structure, which facilitates adding new object types to the system and automatically benefiting fully from the existing server infrastructure, including permissions, categorization, subscriptions and full text indexing. The system also supports custom indexing and the addition of new actions that function in a fully integrated fashion.

Customizability and scalability also arises from object implementation. Security permissions and constraints can be inherited from a defined group. Security is implemented independently for each content object in the system, so that a single rich media presentation can present a different set of supporting information and links to different audiences—and can do so easily and transparently.

The method, system, and apparatus of the invention provide and facilitate a full suite of services, including rich media content production and complete communications design and implementation services on a per project basis.

This results in a more collaborative environment around talks, along with a framework for adding value to talks over time, for example by allowing association of arbitrary objects with intervals within Talks. All object types within the method, system, and apparatus of the invention have the capability of being 'time-sensitive'. This allows the association of a start time and end time with any object instance. When contained within an object that is time-sensitive, like a Talk (or Talk Folder), the container can use the time attributes of the objects to determine when it is appropriate to display them.

Talks are central to the method, system, and apparatus of our invention. Talks are container objects or 'Folders' within the structure of the method, apparatus, and system of the invention. This allows objects to be created inside of talks.

Figure 12:
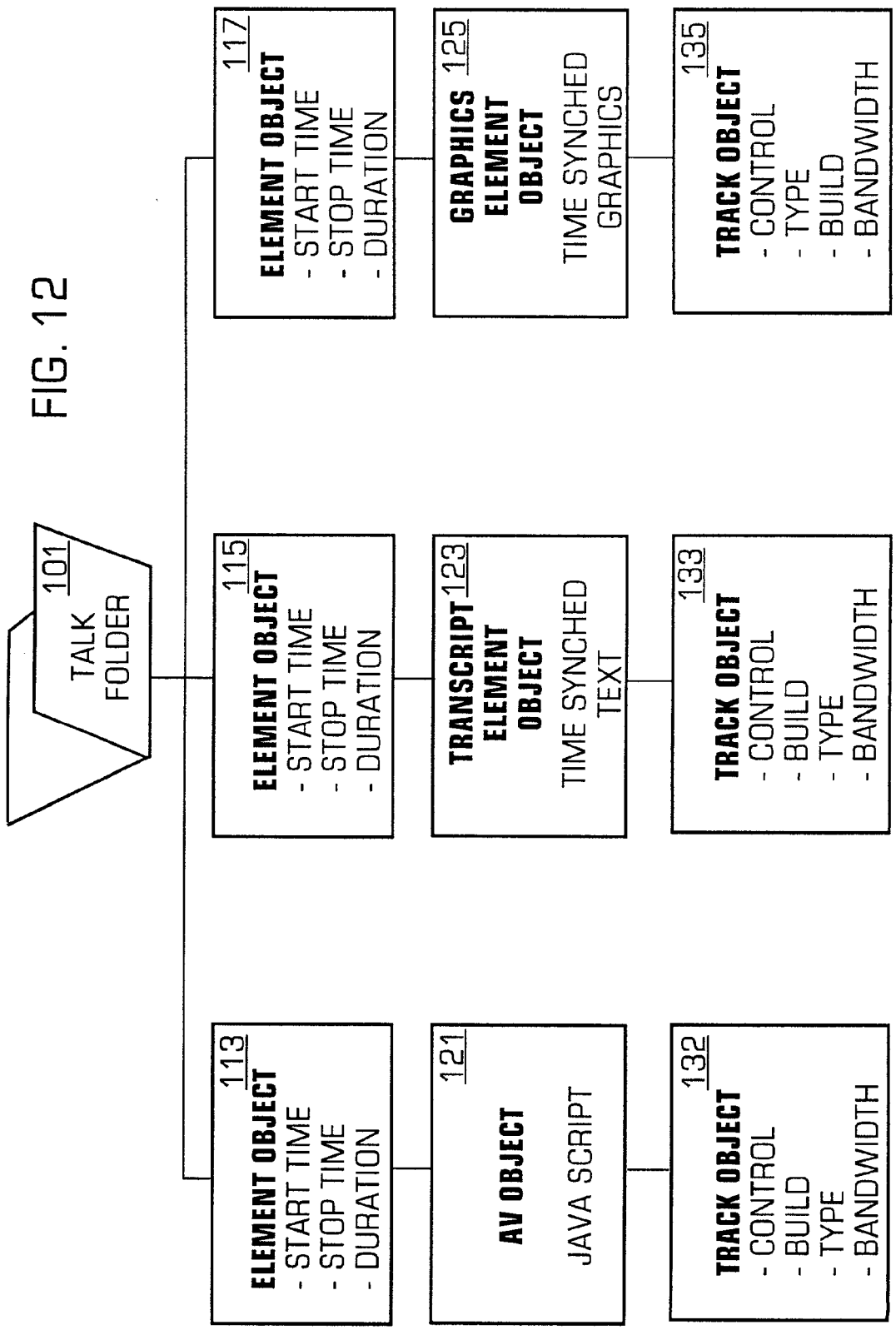
FIG. 12 is a diagram showing the relationship between the "Talk Folder" container object, the element objects, the related objects, and the track objects.

The method, system, and apparatus of the invention are built upon the object model, shown in FIG. 12. The principal organization element in the method, system, and apparatus of our invention is the "Talk." The "Talk" is an object of the container class. FIG. 12 illustrates a "Talk" container class object, 101, containing three element objects. The element objects provide certain properties, inherited by the next level of objects. These properties include start time, stop time, and duration. These time dependent properties are inherited by content objects, such as the AV Object or audio-visual object, 121, the Transcript Element Object, 123, and the Graphics Element Object, 125, which contain Javascript files, time synchronized text, and time synchronized graphics. The content objects are controlled or tracked by tracking objects, 132, 133, and 135, which provide control data, build information, type information, and bandwidth information.

Exemplary objects include:
Polls
Documents
Shortcuts
URLs, and
Folders.

Any object created within a Talk 'Folder' will contain fields for entering start and stop time offset for that object within the talk. This is illustrated in FIG. 12. These fields will appear on the normal edit pages for these objects. Moreover, everything within a talk folder is considered part of the talk. Talks folders implicitly include all of the 'normal' items. One discussion can be associated with each talk.

Content administrators can enable the discussion by selecting the 'Enable Discussion' action on the talk. The discussion will be an implicit member of the Talk; it won't be explicitly displayed as a separate object.

Figure 2:
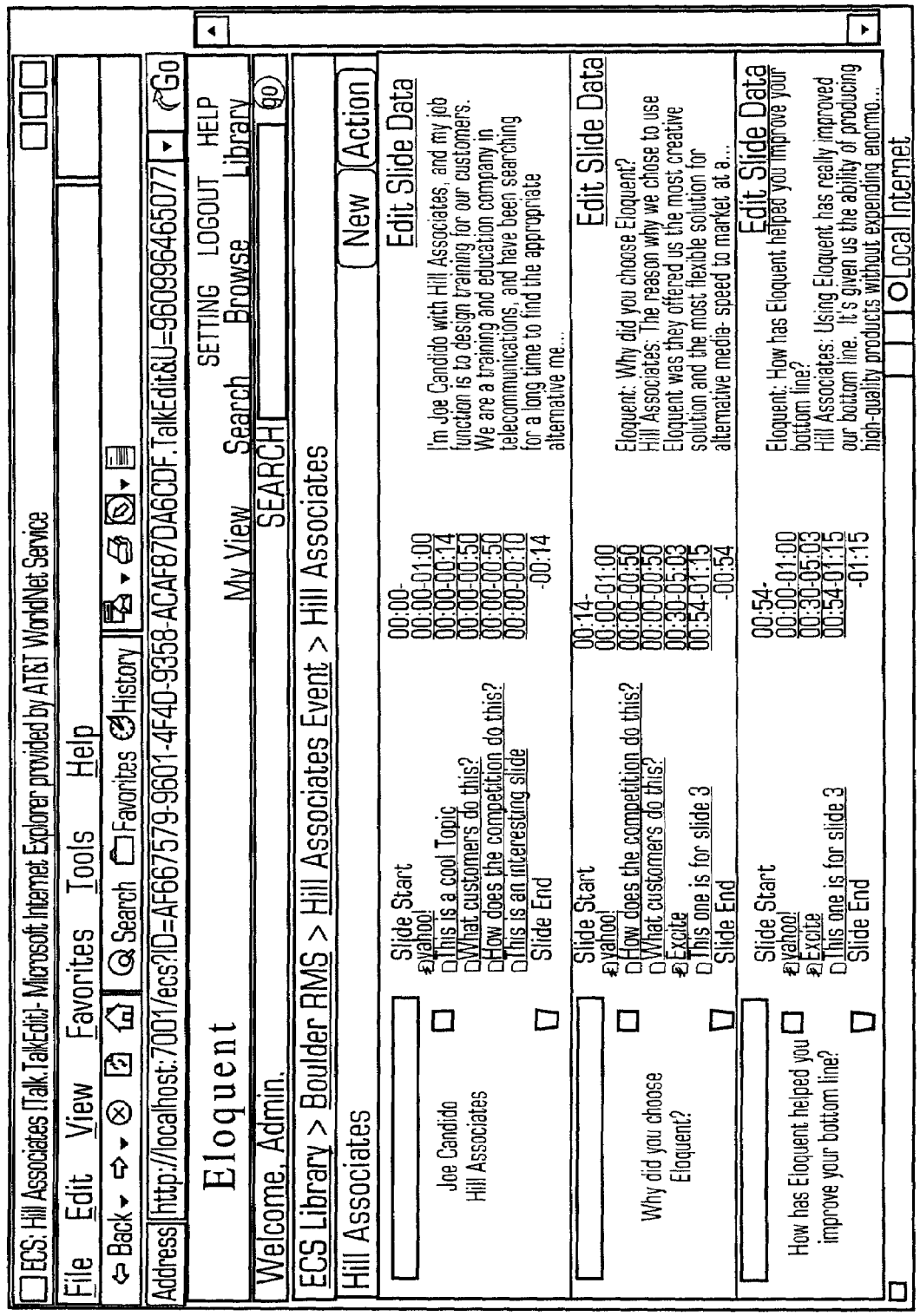
FIG. 2 is a screen shot of an out of time view of a talk view screen.

A talk folder contains at least two views, an "out-of-time" view and an "in-time" view. FIG. 1 is a screen shot of an in-time view of a talk-play screen. The in-time view is a player. The out-of-time view is a vertical timeline expansion of all the presentation objects. FIG. 2 is a screen shot of an out of time view of a talk view screen.

Since the talk folder is a time-sensitive container, the new/edit screen has fields for the start/stop time of the object being created. Default time start/end is the duration of the current slide, but this is editable. Once an item is added to a talk folder, a Control frame updates after the item is added, and displays a list of discussion topics associated with the current time.

The Control screen also displays a 'Add a new topic' link that invokes the 'create topic' screen. The "create topic" screen will act just like a selection from the 'new' menu, and a list of the objects associated with the current time, with a link to their open verb will appear.

Controls frame changes as the talk progresses, displaying the information that is appropriate to that point in the presentation. The window is implemented using DHTML, so all of the content to be displayed will be downloaded in advance. This allows refreshing the information without a server hit.

The talk/view screen or window allows a user to get an overall view of the talk and the objects associated with it. It is useful for a content administrator to bootstrap the conversation, displays all the slides in the talk and associated times, and displays attached objects within the appropriate slide with separate timing info.

If the duration of the object overlaps the slide time at all, it is shown in with that slide. This means that a single object could be displayed for part of a slide, an entire slide, more than one slide, or even for the entire duration of the Talk.

Clicking the start or stop time for the object brings up the edit screen to allow editing of the start/stop time values, as well as those fields normally accessible on the edit screen for that kind of object. Clicking the object name 'opens' the object. Clicking the slide key jumps to that point in the talk (in-time view) or shows a full-size image of the slide, thereby causing creation/attachment of new objects, and shows transcript snippets for each section. Clicking the 'Edit Slide Data' will bring up the Edit Slide Screen.

Figure 3:
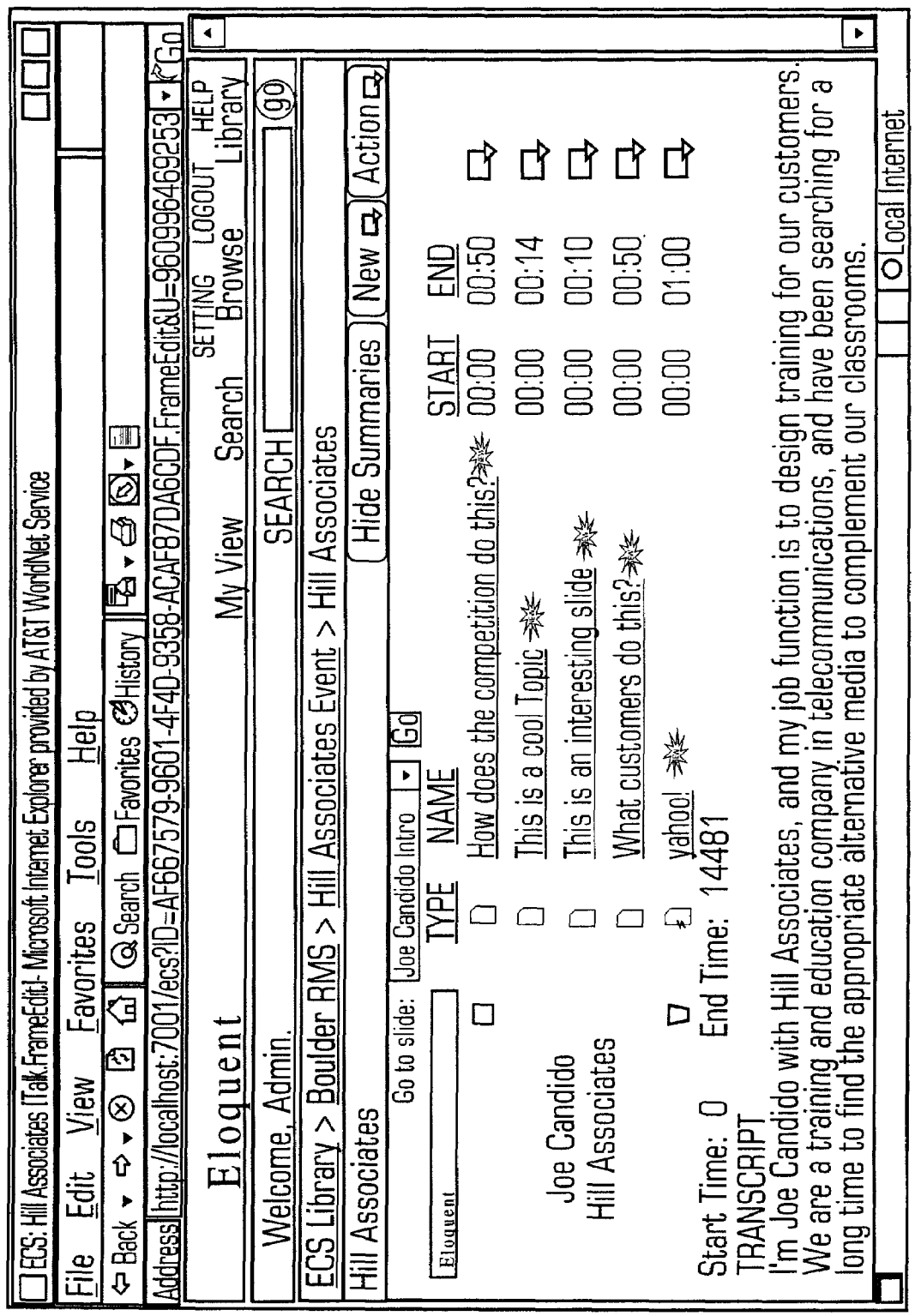
FIG. 3 is a screen shot of the edit slide screen.

The "Edit Slide Screen" is shown in FIG. 3. The "Edit Slide Screen" opens a window that allows actions to be executed on the items attached to a slide in a talk. This is required to edit the objects or manipulate permissions. A pop-up of all the slides in the talk is displayed. Slide titles are displayed in the pop-up in the order they appear in the talk. Selecting a slide and hitting the 'Go' button will allow the user to edit that slide.

The window displays the current slide. The start time and end time for the slide are displayed below the slide.

Clicking on other keys allows loading the talk (frameset) at that slide, or displays a full-size version of the slide.

Figure 4:
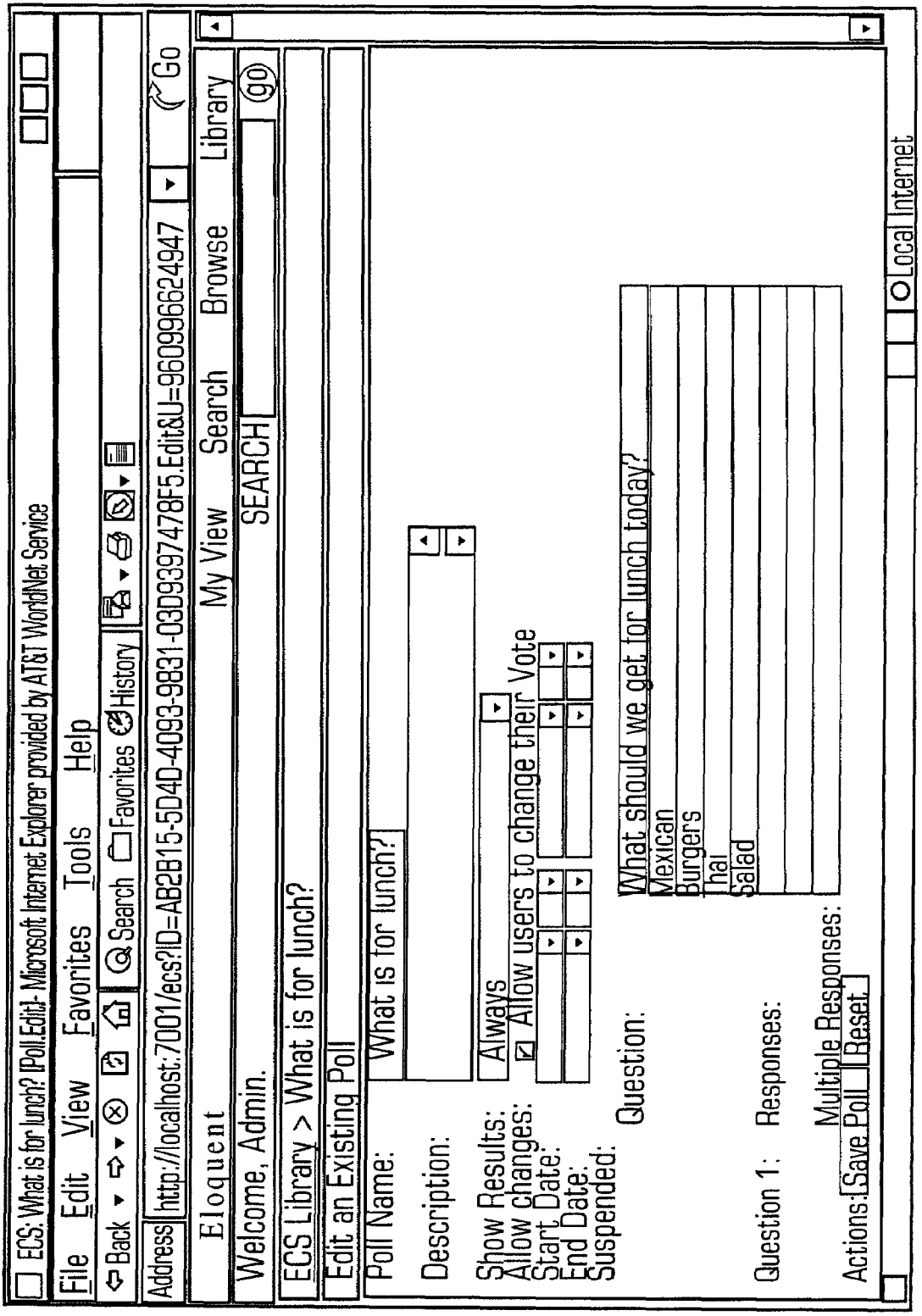
FIG. 4 is a screen shot of the "New/Edit Screen" function.
Figure 5:
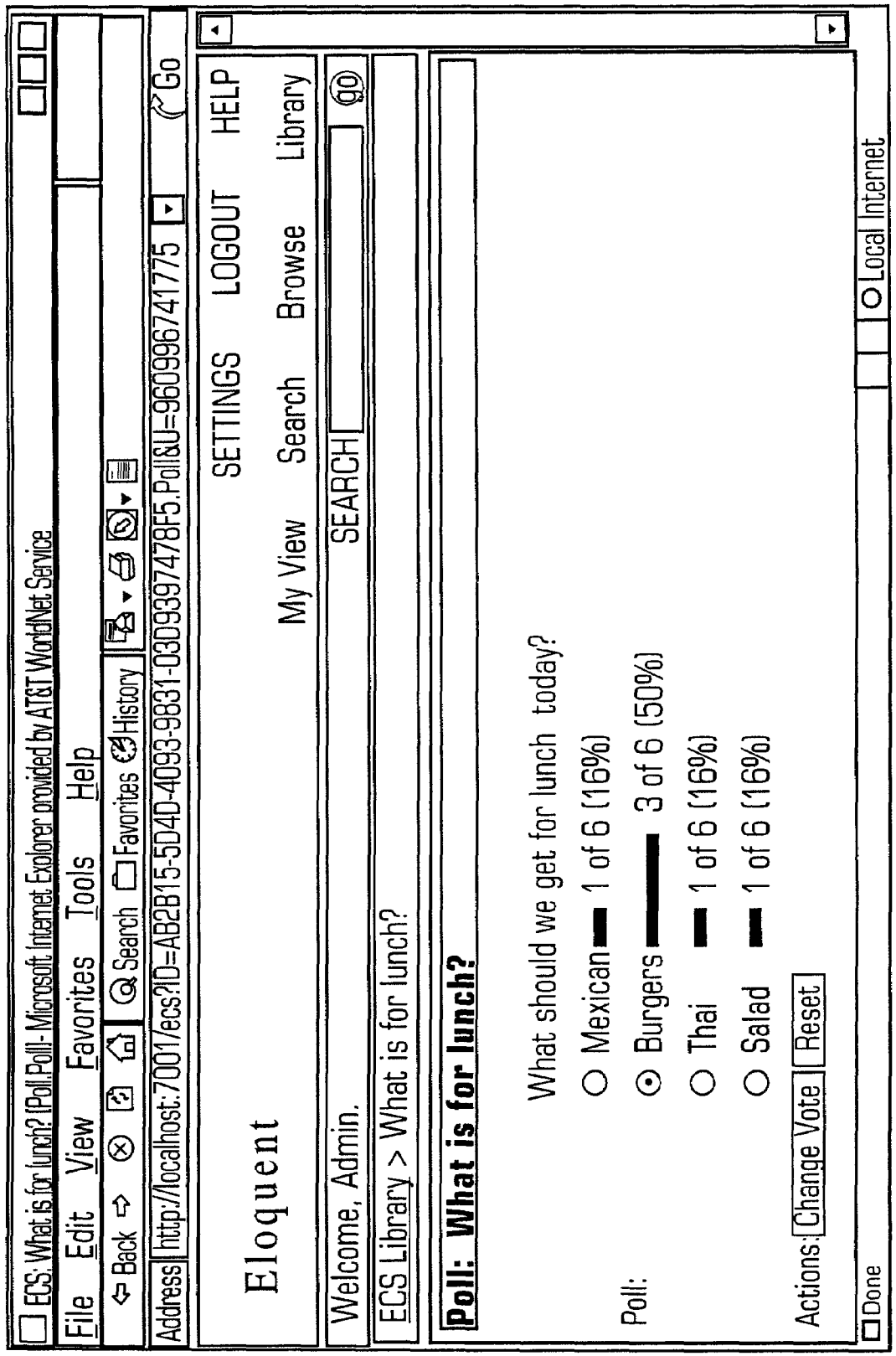
FIG. 5 is a screen shot of the "Single Choice Vote Screen".
Figure 6:
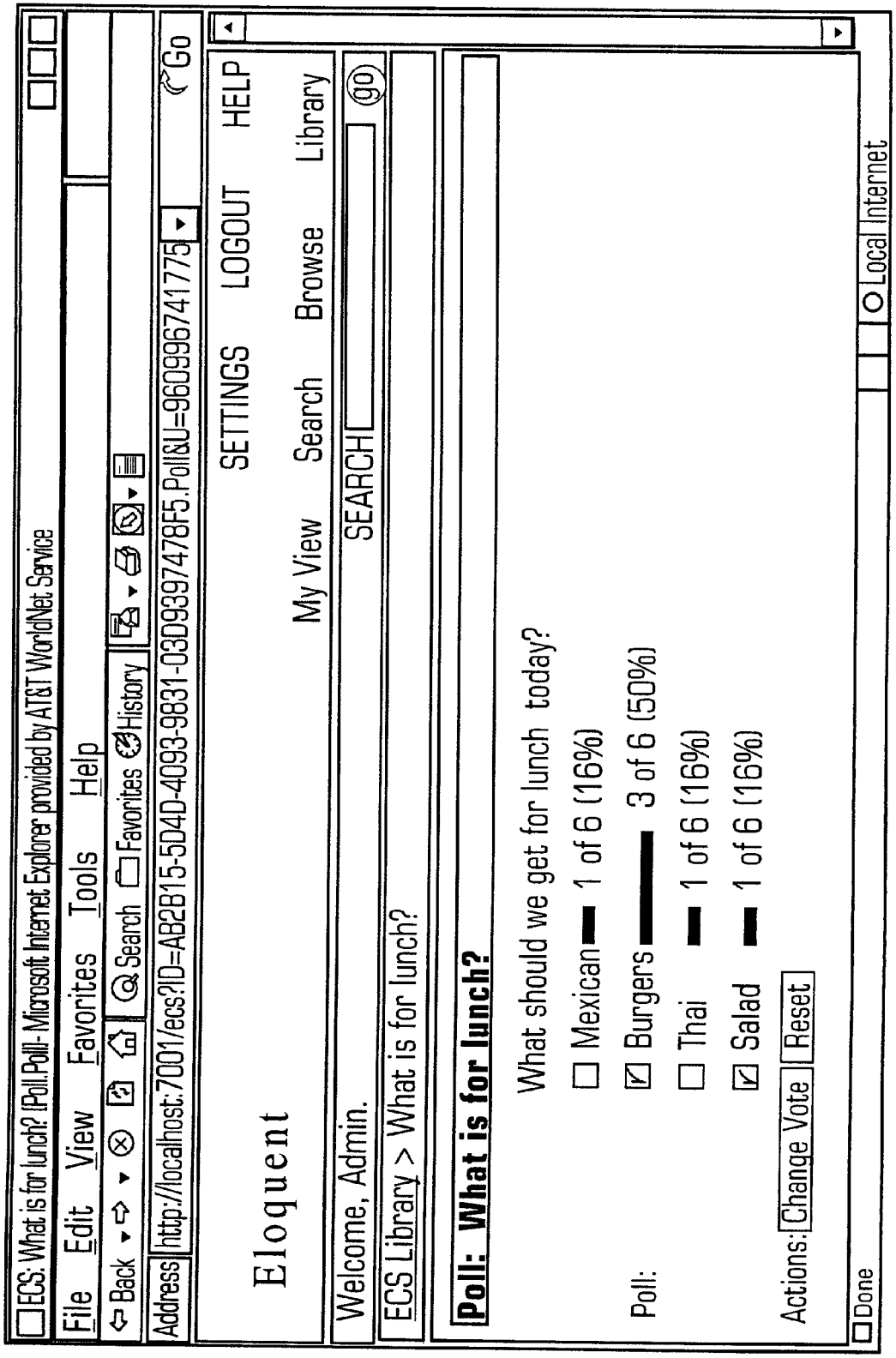
FIG. 6 is a screen shot of the "Multiple Choice Vote Screen".
Figure 7:
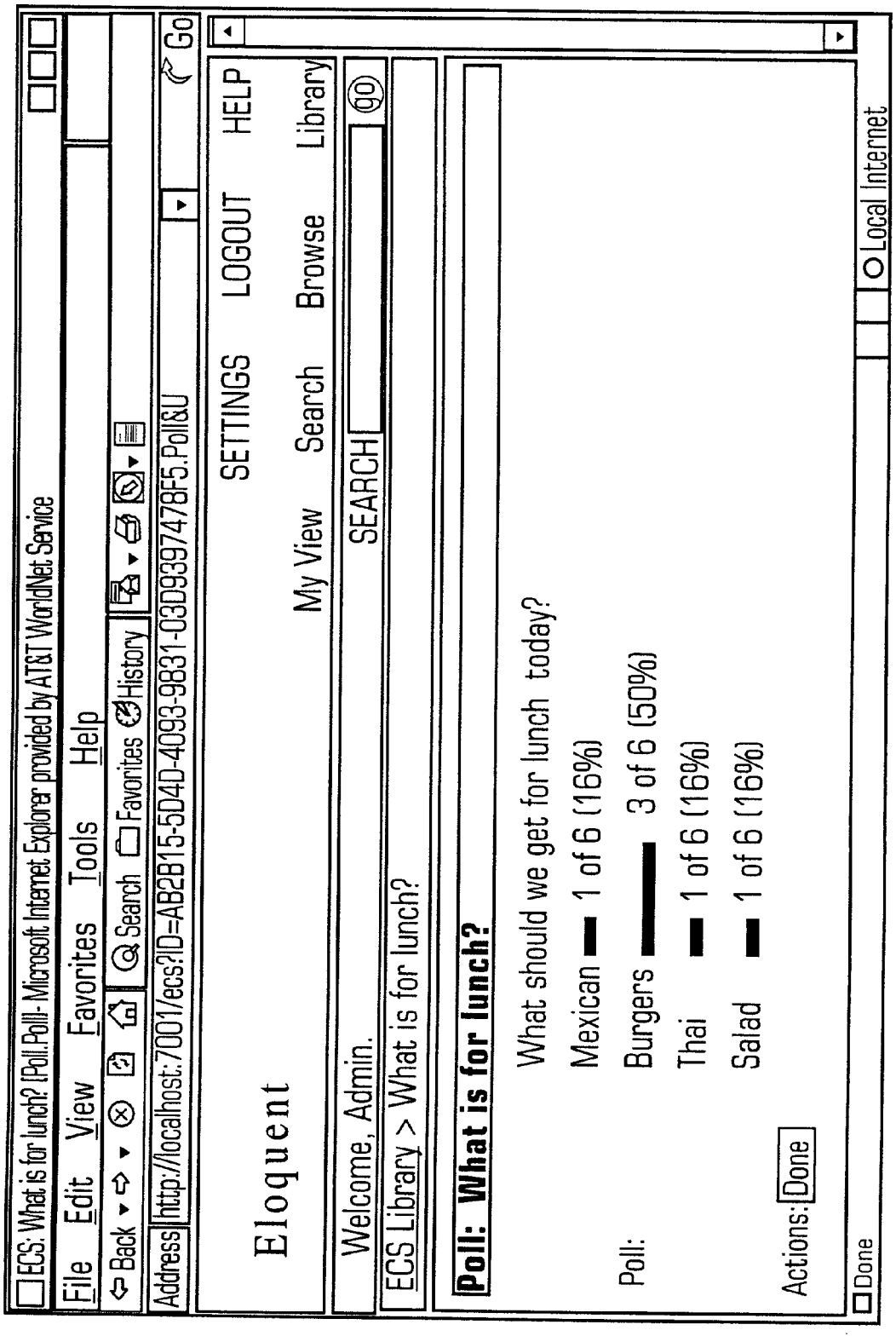
FIG. 7 is a screen shot of the "Poll Results Screen, Single Choice".
Figure 8:
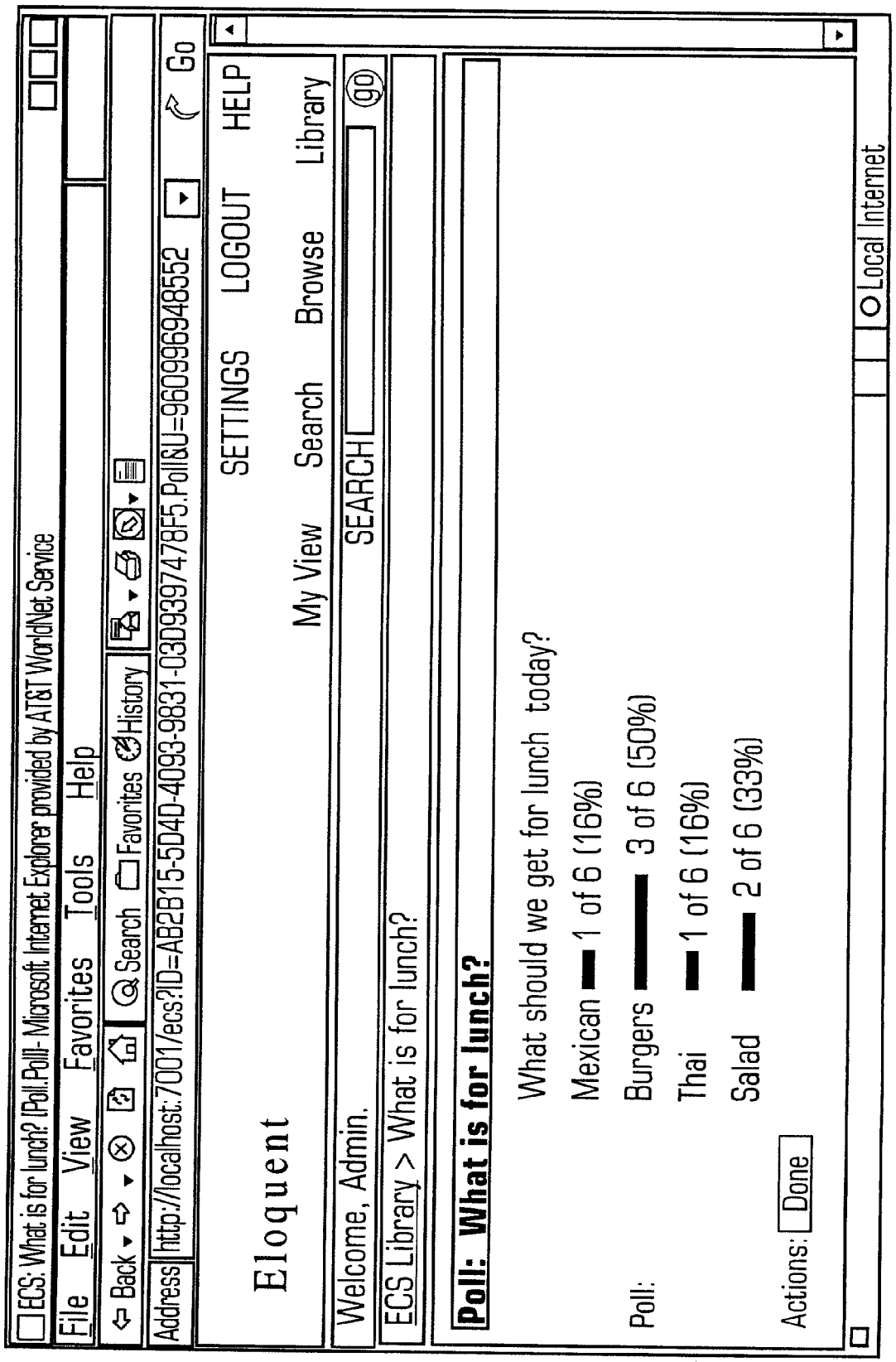
FIG. 8 is a screen shot of the "Poll Results Screen-Multiple Choice."

Screen shots for the Poll Object are shown in FIG. 4 for the "New/Edit Screen" function, FIG. 5 for the "Single Choice Vote Screen", FIG. 6 for the "Multiple Choice Vote Screen", FIG. 7 for the "Poll Results Screen, Single Choice", and FIG. 8 for the "Poll Results Screen—Multiple Choice."

The Poll Object allows surveying the users and displaying the information in a chart. Poll objects are 'first-class' objects like documents and URLs, and can be created anywhere in the system. Just like all other objects, they have permissions, and can be used in recommendations, etc.

The Creator can configure if users can change their votes. When the poll object is called, the system records each users vote. Users are not allowed to vote more than once, although they may be able to change their votes. The creator can configure if and when users can see results, such as Always; (Users can see results before and after they vote), Never; (Users cannot see the results) After, (Users can only see results after they've voted), and After poll ends; (Users can only see results after the poll has ended). The Creator can always see results. The Poll object also allows the creator to suspend the poll. This allows no one new to vote. In running the poll object, the creator must specify a question and at least two responses, and whether the users must pick exactly one or 'zero to n' responses. The form implementation may be radio buttons or checkboxes depending on which option is selected. In the poll object, Read permission is required to see the results (where available), and write permission is required to vote, while Edit permission is required to change options on the poll.

Vote screen (single-choice) is shown in FIG. 5. This is the view that a user with write access who has not voted would see. Vote' submits the users vote. If the user has already voted, clicking the object will show the poll results if the user is allowed to see them. Otherwise it will show an informative message indicating that the user has already voted.

If the 'allow user to change vote' flag is enabled, the button reads 'Change Vote' instead of just 'Vote'. The percentages shown by each item are the number of respondents who voted for that item. They should add up to 100% (+/−fuzz).

The Multiple Choice Vote Screen, shown in FIG. 6, looks and works identically to the previous screen except that the choices are represented by checkboxes rather than radio buttons. This allows the user to select more than one item. The percentages shown by each item are the number of respondents who voted for that item. They do NOT necessarily add up to 100%.

The Poll Results screens, FIG. 7 for the Single Choice and FIG. 8 for the Multiple Choice, are displayed if the user has permissions to see the results and the Poll is configured to allow that. Percentages work as previous described. Users with control permission to the Poll (Admin, creator, etc.) can always see the results.

The Poll Results Multiple Choice screen, shown in FIG. 8, is displayed if the user has permissions to see the results and the Poll is configured to allow that. Percentages work as previous described. Users with control permission to the Poll (Admin, creator, etc.) can always see the results.

The Shortcut object is a pointer or reference to another object in the method, system, and apparatus of the invention. Shortcuts are very useful in cases where you want to reference objects in one place, but don't want to move or copy the object. They are very similar to Windows shortcuts. When displayed in the browse screens, shortcuts use the icon of the object they are pointing at.

Figure 9:
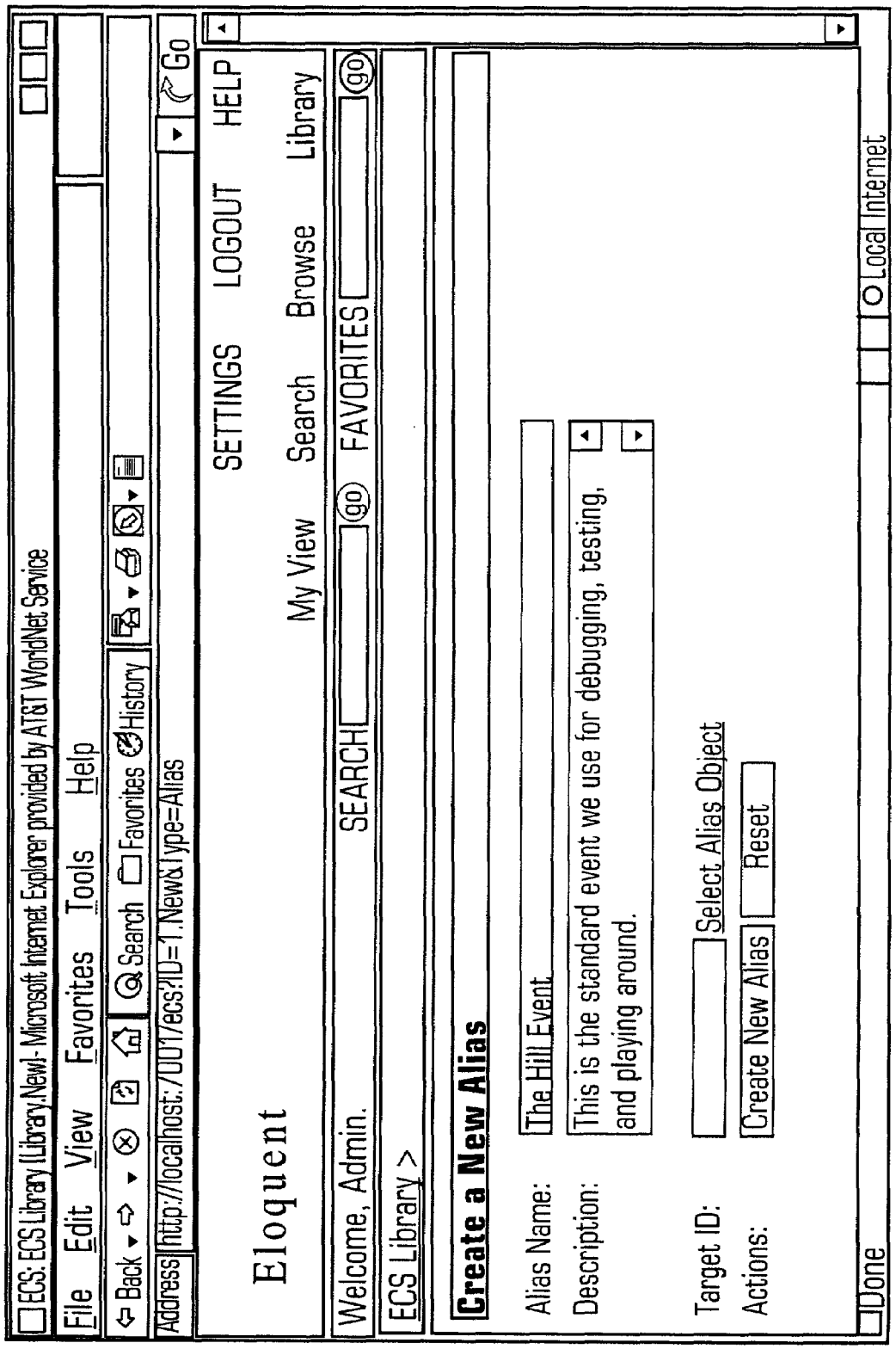
FIG. 9 is a screen shot of the "Create Shortcut" screen.
Figure 10:
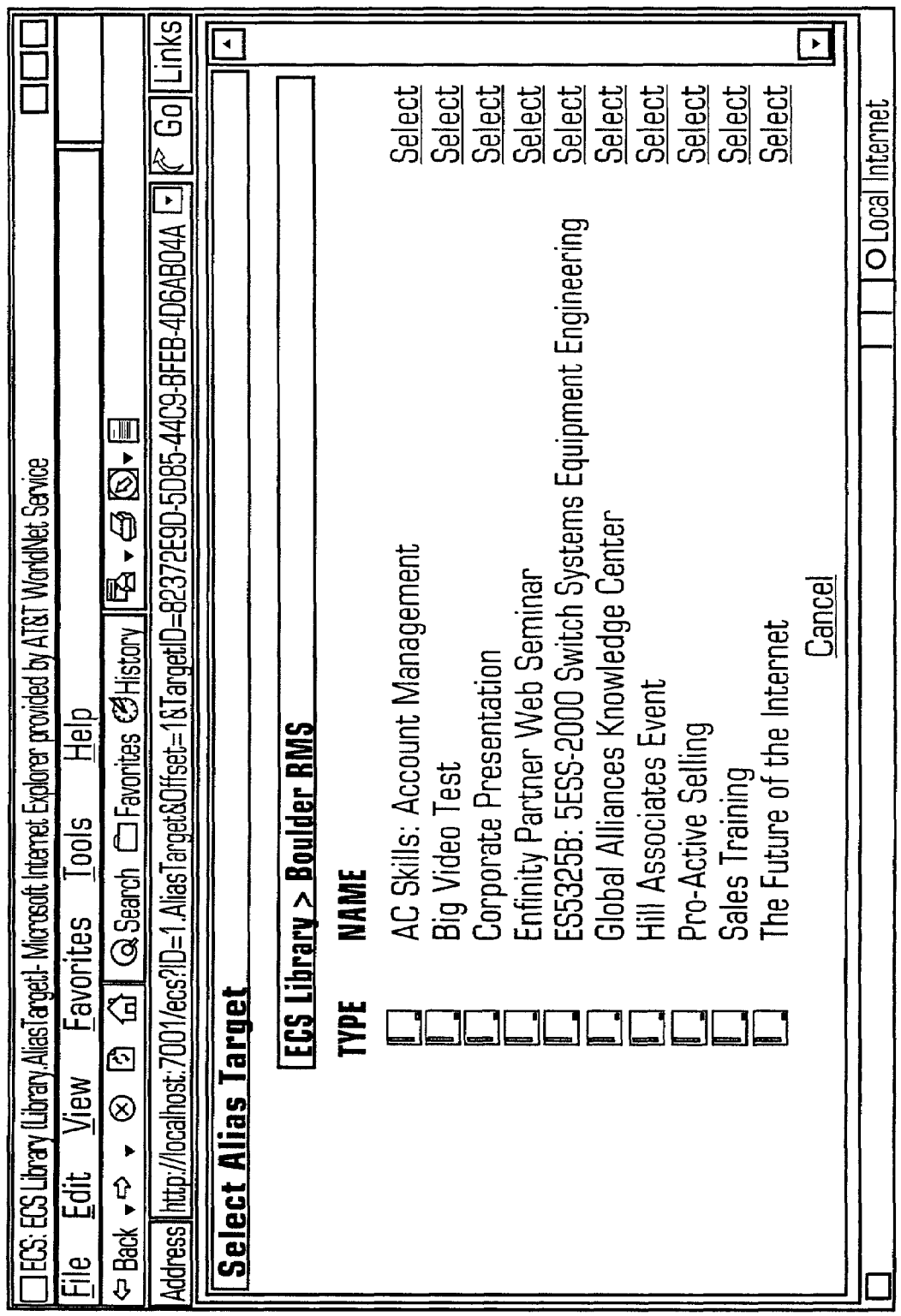
FIG. 10 is a screen shot of the "Select Shortcut Target" screen.

FIG. 9 shows a screen shot of the "Create Shortcut" screen, while FIG. 10 shows a screen shot of the Select Shortcut Target Screen.

Shortcuts, as first-class objects, can have permissions. The permissions on a shortcut only control access to the Shortcut, not to the target object. In order for a user to click on a shortcut and open the target object, they must have read permission to both the shortcut and the target object. If a shortcut is created that a user does not have permission to see, that does not necessarily preclude them from opening the target object directly.

When shortcut objects are full-text indexed, only the metadata for the object is indexed, not the content of the target object.

The Create Shortcut screen, FIG. 9, is a normal edit screen with name and description. A non-typeable box contains the name of the target object. The shortcut can be directed to a new object by clicking the 'Select Object to Shortcut' link which invokes the 'Select Shortcut Target' screen in a new window. If no name is input, the name defaults to 'Shortcut of'+the name of the target object. The target object is the only required field The Select Shortcut Target screen, shown in FIG. 10, allows the user to browse and select any object in the system.

Selecting an object closes the window and fills in the appropriate fields in the Create or Edit Shortcut screen. Hitting the cancel link closes the window.

Figure 11:
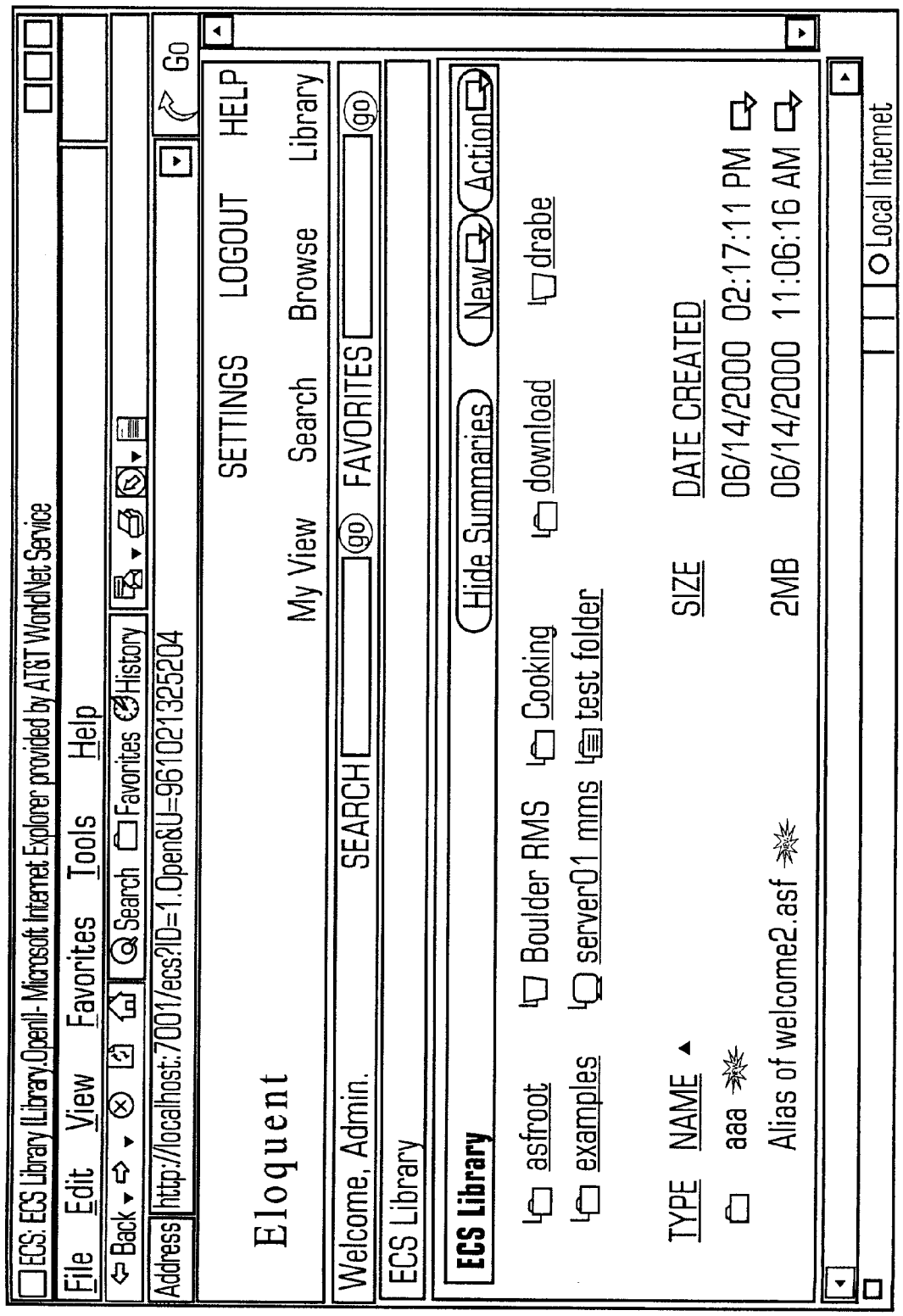
FIG. 11 is a screen shot of the "Browse" view for shortcut object.

Inside the browse view (or any other view), shown in FIG. 11, the shortcut object looks, acts, and behaves like its target object. One exception is that the actions that appear on the Shortcut modify the Shortcut rather than the target object. Clicking on the shortcut will behave exactly as clicking on the original object with one exception—two audit records will be generated; one for opening of the shortcut and one for the original object.

Key to the method, system, and apparatus of our invention is the object structure. In order to have a standards-based, extensible, indexable and searchable persistent object the objects and data structures are architected as follows:

The Objects are serialized to XML. This provides a standards based storage format. That is readable, editable and easily parsed. The serialized Objects are stored with an SQL database.

The method, system, and apparatus of the invention need not use conventional SQL Tables with columns matching the object fields and indexes to access the objects. Instead, to facilitate extensibility we store the object definition as a blob of XML in a single static table. To get indexability of this static table we use a separate indexing table that is capable of indexing an unlimited number of different fields all at once. Traditionally we would have to add more columns to a growing number of SQL tables and growing number of indexes on these tables to store and index all of this type of data. Using our scenario we never change tables to add columns or add indexes to index more fields.

Indexbility. As the number of fields grows we would have to be continually adding indexes to locate and retrieve objects from the persistent store. Each object defines what fields it needs to have indexed. These fields are indexed with a single SQL table.

Searchability. Objects contain searchable content as well as indexable fields so the Object System allows objects to have their content full-text indexed as well. Each object specified what content is to be indexed along with the Object.

Figure 13:
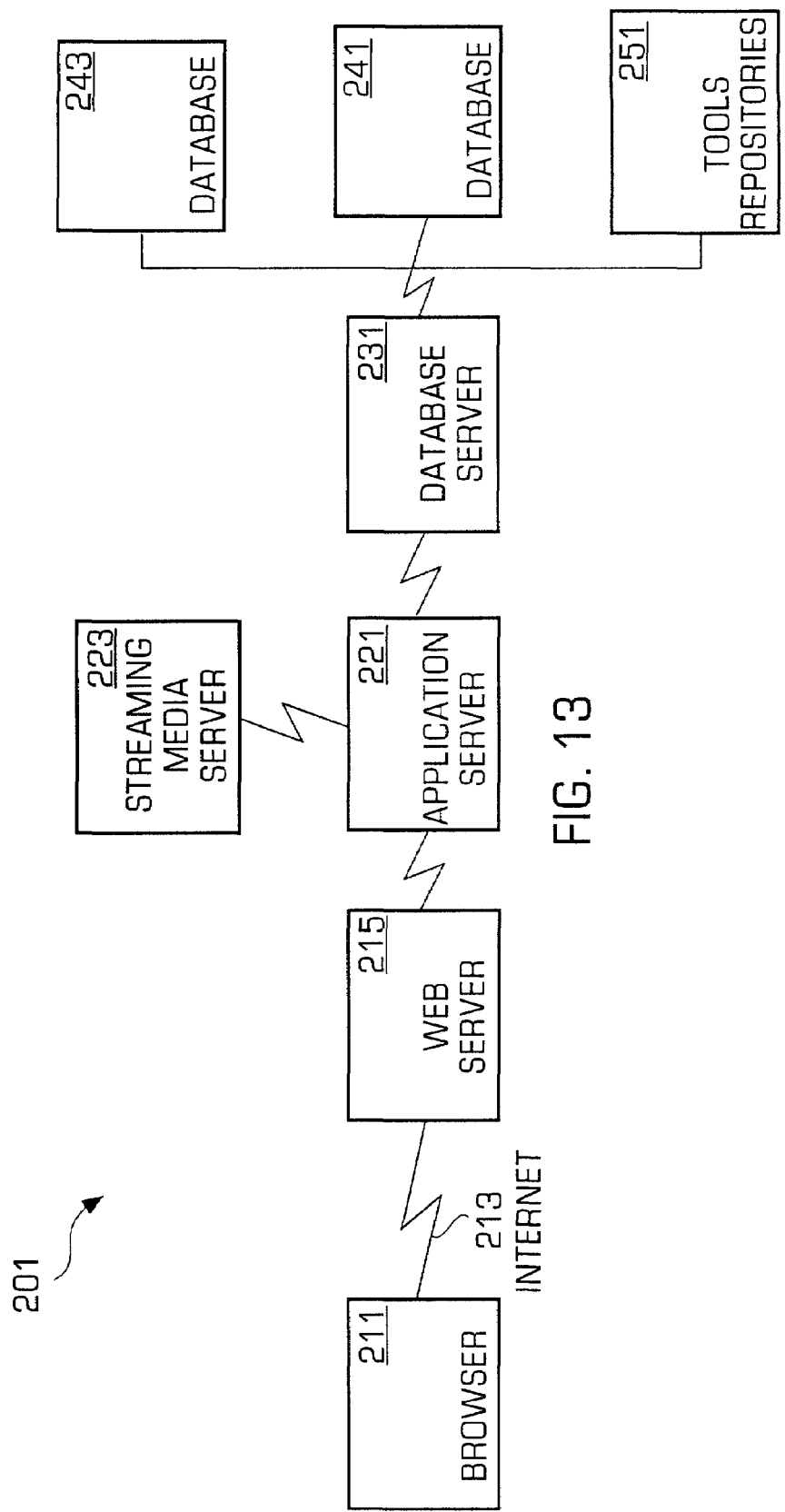
FIG. 13 is a diagram illustrating one type of system, including database servers, application servers, web servers, internets and intranets, and browsers.

One embodiment of the apparatus and system of the invention are illustrated in FIG. 13, which shows a web-based exemplification. The system and apparatus, 201, has a web browser, receiving data, as pages and data, over an internet 213 or intranet, from a web server, 215. The web server, 215, receives data from an application server, 221, which, in turn, receives data from a source of streaming media, 223, and a database server. The database server, 231, interacts with various databases, 241 and 243, as well as tools repositories, 251, which may contain tools, applets, servlets, business objects, and the like.

The method, system and apparatus of our invention are also built on standards. These include Java JDK 1.2.2 (Java2), Java Servlets 2.2, Java Server Pages 1.1 (JSP) JDBC 2.2, Extensible Markup Language (XML), Java Messaging Service (JMS), Java Naming Service 1.2 (JNDI). The method, system, and apparatus of our invention is also built upon and synergistically integrates third party tools, such as WebLogic Server 5.1.0 sp4+, Microsoft SQL Server 7.0 sp1+, Oracle 8i (8.1.6), Sybase Adaptive Server 6.0, Verity 4.2, and Xerces (Apache) XML Parser 1.1.1.

The servlet is named/ecs by default, and is a singleton that lasts for the time the WebLogic server is running. A request in the system, method, and apparatus of our invention completely manages all HTTP GET and POST requests. Requests must specify at least an Object and a method, such as /ecs?ID=<objectID>.<method> or /ecs/<objectID>/<method>. The servlet lasts for the duration of a request.

Figure 14:
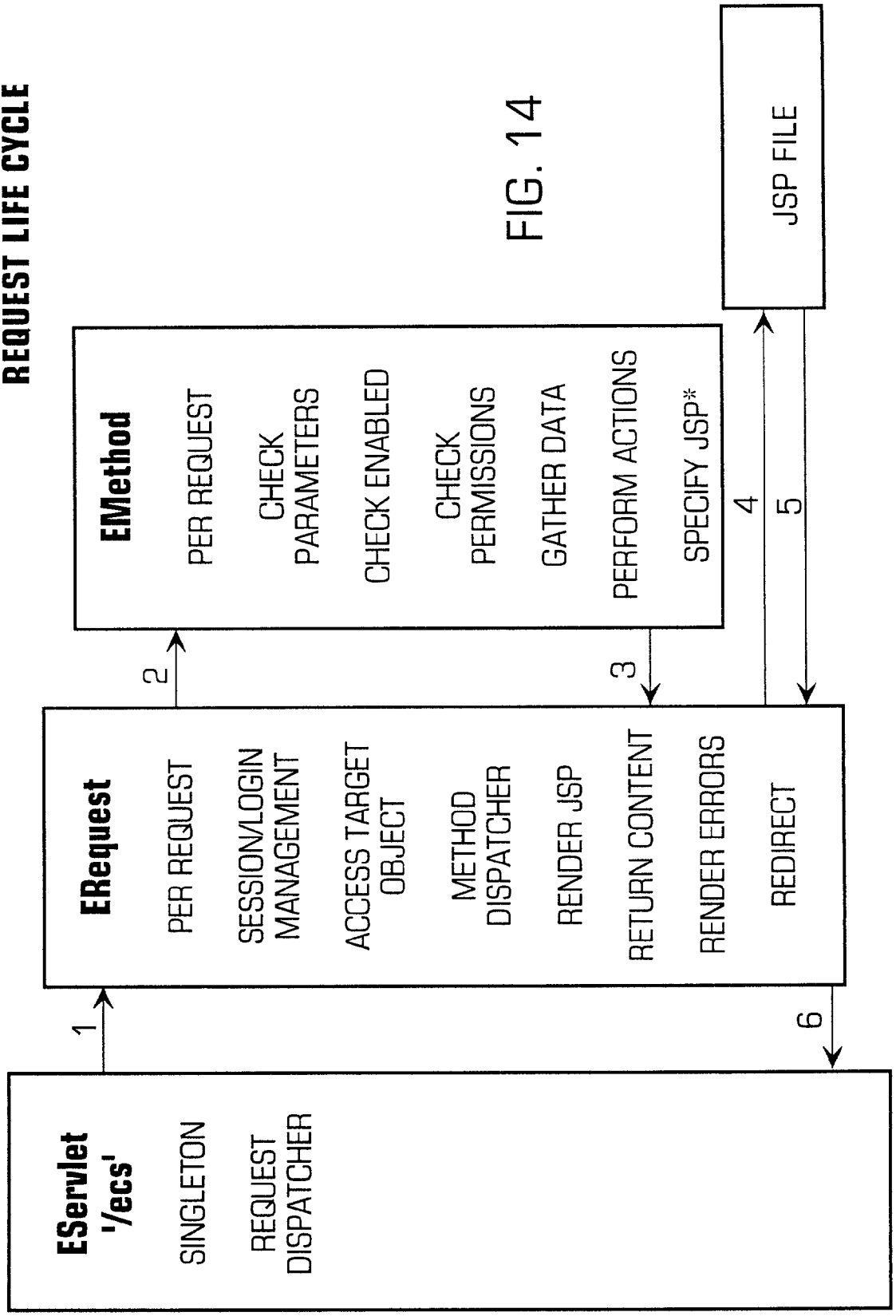
FIG. 14 illustrates a request life cycle according to one embodiment of the invention.

FIG. 14 illustrates a request life cycle according to one embodiment of the invention.

Methods in the method, system, and apparatus of our invention control all interactions with objects. That is, all interactions with objects are through methods. Methods act on objects, and are also known as Verbs or Actions. A method lasts for the Duration of a Request. The base class of methods is Emethod.

Figure 15:
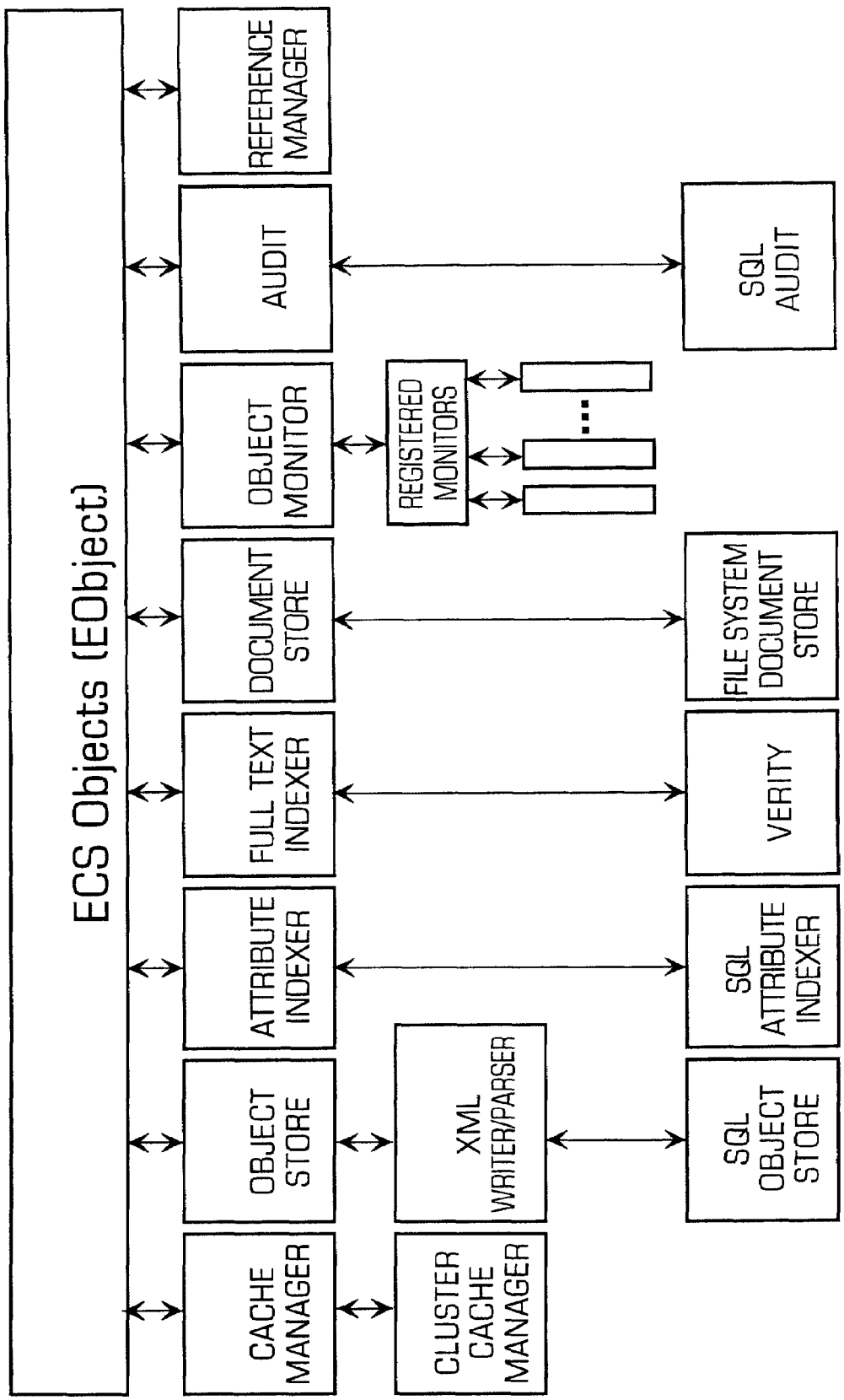
FIG. 15 illustrates an Object architecture according to one embodiment of the invention.

Everything in the method, system, and apparatus of our invention is an Object. An object is the basic data entity, and it encapsulates all related logic. Objects are persistent. The base class is the EObject FIG. 15 illustrates an Object architecture according to one embodiment of the invention.

The Object architecture includes object stores, object caches, an object indexer, an object monitor, an XML Parser, and an XML Writer. Further aspects of the Object architecture include a full-text indexer, cache synchronization, a task manager, auditing functionality, reference management, and a document store The Method architecture of the method, system, and apparatus of our invention requires that all GUI Initiated Interactions be managed by Methods, that methods perform actions on objects, and that methods produce a GUI output. Further aspects of the Method Architecture include performing input checking, parameters, enabled status, permissions, privileges, object state, executing, gathering GUI related data, and performing the specified action on the specified object(s). Still further aspects of the method architecture including specifying the GUI output, JSP File, issuing Errors, Warnings or Info, operating on content, and redirecting.

The Object Store stores all persistent objects, is RDBMS (SQL) Based, and operates on XML (Writer and Parse) and the SQL Table:

The Object Cache functions by lookup by Object Ids, controls object lifetime management, and implements cache synchronization when using WebLogic Clusters The Object Indexer manages the Attribute Indexer, the Attribute Search Engine, the Attribute Query, the Object Indexer, the Attribute Indexer, the Attribute Search Engine, the Attribute Query 'Language, such that object implementations specify indexed attribute fields, and the SQL Table:

Object Monitors are registered and monitor the creation all new objects, and the updates to existing objects.

The Full-Text Indexer is a content indexer, content search engine, and a content query language. Object implementations specify attribute fields and content to be indexed.

The Document Store stores all managed content. It is file system based, and may be full-text indexed.

The Auditing function is such that methods can audit the actions they perform on objects and on themselves, as well as system actions.

Reference Management handles deletion of objects, as well as the registration of how objects play in the system, and what other objects the objects own or contain.

A WebLogic Property File files weblogic.properties, controls the WebLogic configuration and required changes, registers servlets, and is JSP servlet enables. It also controls cluster configuration, JNDI Configuration, and JMS Configuration.

The Property Files file: system and method .properties, file: system and method .overrides.properties, any module related property files, control all system and method related configuration, control registered objects, control registered methods, Implemented Object Types include Library, Folder, URL, Shortcut, Category, Search, Category, Poll, Discussion, Topics, Replies, Read List, Users, Groups, RMS Repository, File System Repository, Microsoft Media Server Repository, and Real Media Server Repository.

The Permissions Levels on Objects include, Read (Open, View), Write (Populate, Participate), Edit (Modify Attributes), and Delete (Control Permissions).

In the method, system, and apparatus of our invention, access control lists are provided. The Access Control Lists are attached to each Object, and contains entries for users and groups who have some type of access to the object. Each entry specifies a permission level (RWED). In the method, system, and apparatus of our invention, Permission ACLs are subject to the following rules: granted permissions are additive, inherited from containing object, can be 'indirected' to another object, Closely related to permission Access Clearance Lists are Extended Object Permissions, including Hide Before (Effective Date), Hide After (Expiration Date), and Hide Always.

The method, system, and apparatus of the invention provide Privileges on users. These include Bypass, Admin, Login, and Alter.

User Password Management modules specify minimum number of letters, minimum number of digits, minimum and maximum lengths, history lists, expiration dates, pre-expired passwords, and stored one-way encrypted.

System Management modules within the method, system, and apparatus of our invention include utilities for database initialization, utilities for database upgrade, MD5, GUID—Unique ID Management, RMS Usage Reporting, Database Import, and CSV User Import.

User customization includes capability for and support of, page decoration overrides, company logo (GIF, URL, alt), top-level labels (i18n), HTML includes, company logo area (below company logo), login page banner (above fields), tab configuration, which top-level tabs, my view, search, browse, library, and order of top-level tabs, among others.

Other utilities support authentication, including creating users and groups, user logs, public access and guest accounts, and sign up, a REMOTE_USER Header for Login User Name with No Password Required, Automatic User Creation when REMOTE_USER is detected.

The system servlets are singletons and include requests, session/login management, access target object, method dispatcher, render JSP, return content, render errors, redirect, method, check parameters, check enabled, check permissions, gather data, perform actions, specify jsp*, and request life cycle.

Objects include, cache, manager, object, store, attribute, indexer, cluster, cache, manager, writer/parser, object, monitor, full-text, document, store, verity, attribute, indexer, reference, manager, file system, document, store, audit, object, store, registered, and monitors.

Database Schema

The system, method, and apparatus of the invention rely on a relational database to store Object attribute information as well as audit and tracking data. Oracle version 8 and MS-SQL Server 7 are both supported. One of the more significant differences between Oracle and SQL7 is in their support of identity columns (columns which are to be assigned numerically increasing unique values). SQL7 supports the "identity" keyword, whereas Oracle requires the use of a sequence. Since this affects how code is written, inserts into tables with an identity column are performed through stored procedures, allowing our Java code to be the same regardless of the database system being used. Other database-specific constructs are isolated to views (for example, EUsageSummaryView), again relieving the Java code of having any database-specific knowledge.

SQL7/Oracle datatype mapping

| SQL7 | Oracle |
|---|---|
| varchar | varchar2 |
| int | integer (translated by Oracle to number(38)) |
| datetime | date |
| text | long |
| image | blob |

TABLES

Table: ESystem
Stores database and system properties as key-value pairs.

| Column Name | Datatype | Length | Description |
|---|---|---|---|
| SystemKey | varchar | 32 | PK: The key. |
| SystemValue | varchar | 2000 | The value. |

Table: EIndex
Stores attribute information for every object.

| Column Name | Datatype | Length | Description |
|---|---|---|---|
| ObjectID | varchar | 40 | The system, method, and apparatus of the invention ObjectID of the object. |
| FieldName | varchar | 32 | The attribute name. |
| FieldValue | varchar | 512 | The attribute value. |

Index: EIndex__Index1 (ObjectID, FieldName, FieldValue)
Index: EIndex__Index2 (FieldName, FieldValue, ObjectID)

Table: EObjects
Stores object definitions as a blob of XML data.

| Column Name | Datatype | Length | Description |
|---|---|---|---|
| ObjectID | varchar | 40 | PK: The system, method, and apparatus of the invetion ObjectID of the object. |
| ObjectVersion | int | | The last version number of the Object stored. |
| ObjectBlob | text | | The XML object definition. |

Table: EDocuments
Stores uploaded document content (current unused).

| Column Name | Datatype | Length | Description |
|---|---|---|---|
| DocumentID | varchar | 40 | PK: The system, method, and apparatus of the invention document ID. |
| DocumentBlob | image | | The document content. |

Table: EPoll
Stores responses to Polls.

| Column Name | Datatype | Length | Description |
|---|---|---|---|
| PollID | varchar | 40 | The system, method, and apparatus of the invention ObjectID of the Poll object. |
| UserID | varchar | 40 | The system, method, and apparatus of the invention ObjectID of the User who responded. |
| QuestionID | int | | The zero-based index of the question. |
| Response | varchar | 100 | Text response (reserved for future use). |
| Response1 | int | | Response to the first choice (one if selected, zero if not). |
| Response2 | int | | Response to the second choice (one if selected, zero if not). |
| Response3 | int | | Response to the third choice (one if selected, zero if not). |
| Response4 | int | | Response to the fourth choice (one if selected, zero if not). |
| Response5 | int | | Response to the fifth choice (one if selected, zero if not). |
| Response6 | int | | Response to the sixth choice (one if selected, zero if not). |
| Response7 | int | | Response to the seventh choice (one if selected, zero if not). |
| Response8 | int | | Response to the eighth choice (one if selected, zero if not). |
| Response9 | int | | Response to the ninth choice (one if selected, zero if not). |
| Response10 | int | | Response to the tenth choice (one if selected, zero if not). |

Index: EIndex__Index1 (PollID, UserID, QuestionID)

Table: EAudit
Stores information about when data was accessed and by whom.

| Column Name | Datatype | Length | Description |
|---|---|---|---|
| AuditID | int | | PK, IDENTITY: The unique ID of this audit record. |
| ObjectID | varchar | 40 | Typically, the ObjectID of the object that was accessed. In some cases, such as failed login attempts, this will be the ID of the System object (3). |
| ObjectName | varchar | 512 | The name of the object corresponding to ObjectID. |
| TargetID | varchar | 40 | The ObjectID of a secondary object that was involved in the audit event. |
| UserID | varchar | 40 | Typically, the UserID of the user that accessed the object. In some cases, such as failed login attempts, this will be the ID of the Admin user (11). |
| AuditAction | varchar | 32 | A short string representing the action that was audited, such as login, open, delete, etc. A list of these strings is in EAudit.java. |
| AuditDate | datetime | | The date and time of the audit event. |

TABLES-continued

| Column Name | Datatype | Length | Description |
|---|---|---|---|
| Detail | varchar | 255 | Additional detail text. If the request was initiated by an HTTP client, this is the HTTP result code (e.g. 200 for success). |
| ClientAddress | varchar | 255 | If the request was initiated by an HTTP client, this is the IP address of the client. |
| UserAgent | int | | If the request was initiated by an HTTP client, this is the UserAgent of the client (references EBrowserAgent.BrowserID). |

Index: EAudit_Index1 (ObjectID)
Index: EAudit_Index2 (UserID)
Index: EAudit_Index3 (AuditDate)

Table: EBrowserAgent
Stores the names of browser user-agents.

| Column Name | Datatype | Length | Description |
|---|---|---|---|
| BrowserID | int | | IDENTITY, PK: The unique ID of this record. |
| BrowserAgent | varchar | 255 | The name of the HTTP client user-agent (as sent by the browser). |

Unique Index: EBrowserAgent_Index1 (BrowserAgent)

Table: EPlayerAgent
Stores the names of Eloquent Player clients.

| Column Name | Datatype | Length | Description |
|---|---|---|---|
| PlayerID | int | | IDENTITY, PK: The unique ID of this record. |
| PlayerAgent | varchar | 255 | The name of the Player (as sent by the player plug-in or control). |

Unique Index: EPlayerAgent_Index1 (PlayerAgent)

Table: EViewings
Stores information about talk viewings.

| Column Name | Datatype | Length | Description |
|---|---|---|---|
| AuditID | int | | A reference to the EAudit record that corresponds to this record. The EAudit record contains basic information about when and by whom the information was accessed. The record in this table contains additional Talk-specific data. |
| EloTalkID | varchar | 16 | The Eloquent Talk ID of the talk that was viewed. Do not confuse this with the system, method, and apparatus of the invention ObjectID of the talk, which can be found in EAudit.ObjectID. |
| PlayerAgentID | int | | The name of the Player agent that was used to view the talk (references EPlayerAgent.PlayerID). |
| OpenTime | datetime | | The date and time the talk was opened. |
| CloseTime | datetime | | The date and time the talk was closed. |
| ClientAddress | varchar | 255 | The IP address of the client that viewed the talk. |
| BytesSent | int | | The number of bytes streamed from the media server to the client. |
| Flags | int | | Bit mask that represents viewing attributes. |
| CompletionCode | int | | Zero = successful Non-zero = failed |
| TalkPercent | int | | The percentage of the talk that was viewed. |
| SlidesPercent | int | | The percentage of the slides that were viewed. |
| Duration | int | | The amount of time spent viewing. |
| ConnectTime | int | | The difference between OpenTime and CloseTime, expressed in number of seconds. |
| Kbps | int | | The bandwidth used by this viewing, as expressed in kilobits per second. |

Unique Index: EViewigs_Index1 (Kbps)

Table: EQuiz Responses
Stores information about quiz response data. A record in this table may have many EQuizAnswers records associated with it.

| Column Name | Datatype | Length | Description |
|---|---|---|---|
| QuizResponseID | int | | IDENTITY, PK: The unique ID of this record. |
| AuditID | int | | A reference to the EAudit record that corresponds to this record. The EAudit record contains basic information about when and by whom the information was accessed. The record in this table contains additional Quiz-specific data. |
| EloTalkID | varchar | 16 | The Eloquent Talk ID of the talk that was viewed. Do not confuse this with the system, method, and apparatus of the invention ObjectID of the talk, which can be found in EAudit.ObjectID. |
| PlayerAgentID | int | | The name of the Player agent that was used to view the talk and take the quiz (references EPlayerAgent.PlayerID). |
| OpenTime | datetime | | The date and time the talk was opened. |
| CloseTime | datetime | | The date and time the talk was closed. |
| ClientAddress | varchar | 255 | The IP address of the client that viewed the talk and took the quiz. |
| BytesSent | int | | The number of bytes streamed from the media server to the client. |
| Flags | int | | Bit mask that represents viewing attributes. |
| CompletionCode | int | | Zero = successful Non-zero = failed |
| NumQuestions | int | | The number of total questions in the quiz. |
| NumWithAnswers | int | | The number of questions in the quiz that define a correct answer. |
| Grade | int | | The grade for this quiz response, expressed as a percentage, and defined as the number of correct answers divided by the number of questions in the quiz. |

Table: EQuizAnswers
Each record represents one answer to the quiz question.

| Column Name | Datatype | Length | Description |
|---|---|---|---|
| QuizResponseID | int | | PK[1]: The ID of the QuizResponse that this answer is associated with (references EQuizResponses.QuizResponseID). |

TABLES-continued

| | | | |
|---|---|---|---|
| AnswerNumber | smallint | | PK[3]: The zero-based answer number for this particular QuizResponseID and QuestionID. |
| QuestionID | smallint | | PK[2]: The number of the question that is answered by this record. |
| QuestionType | smallint | | The type of question:<br>0 = multiple choice<br>1 = essay |
| Correct | smallint | | 0 = incorrect<br>1 = correct<br>2 = not applicable |
| MultiChoiceAnswer | smallint | | The multiple choice answer that was selected by the user. |
| EssayAnswer | varchar | 2000 | The essay answer. |

Legend:
PK—Primary Key column
IDENTITY - Column is assigned unique values (identity in SQL7, uses a sequence in Oracle)

Views are used in the system, method, and apparatus of the invention to isolate database-specific constructs and to aggregate information for reporting.

View: EUsageView
A view that joins EAudit, EViewings, and EIndex to consolidate information for usage reports.

| Column Name | Datatype | Length | Description |
|---|---|---|---|
| AuditID | int | | The ID of the audit record (references EAudit.AuditID). |
| ObjectID | varchar | 40 | The system, method, and apparatus of the invention Object ID of the Talk that was viewed. |
| UserID | varchar | 40 | The system, method, and apparatus of the invention Object ID of the User that viewed the talk. |
| UserName | varchar | 256 | The Name corresponding to UserID (references EIndex.FieldValue where EIndex.FieldName='Name') |
| EloTalkID | varchar | 16 | The Eloquent Talk ID (references EViewings.EloTalkID). |
| TalkName | varchar | 256 | The Name corresponding to Object ID (references EIndex.FieldValue where EIndex.FieldName='Name'). |
| EventID | varchar | 40 | The system, method, and apparatus of the invention Object ID of the Event that contains the talk (references EIndex.FieldValue where EIndex.FieldName='ParentID') |
| EventName | varchar | 256 | The Name corresponding to EventID (references EIndex.FieldValue where EIndex.FieldName='SourceEvent') |
| OpenTime | datetime | | The date and time the talk was opened. |
| CloseTime | datetime | | The date and time the talk was closed. |
| ConnectTime | int | | The difference between OpenTime and CloseTime, expressed in number of seconds. |
| Kbps | int | | The bandwidth used by this viewing, as expressed in kilobits per second. |
| ClientAddress | varchar | 255 | The IP address of the client that viewed the talk. |
| BytesSent | int | | The number of bytes streamed from the media server to the client. |
| TalkPercent | int | | The percentage of the talk that was viewed. |
| SlidesPercent | int | | The percentage of the slides that were viewed. |
| Duration | int | | The amount of time spent viewing. |

View: EQuizResponseView
A view that joins EAudit, EQuizResponse, EQuizAnswers, and EIndex to consolidate information for quiz reports. Due to limitations in some database systems, this view is implemented using tow subsidiary views, EQuizResponseView1 and EQuizResponseView2.

| Column Name | Datatype | Length | Description |
|---|---|---|---|
| AuditID | Int | | The ID of the audit record (references EAudit.AuditID). |
| ObjectID | Varchar | 40 | The system, method, and apparatus of the invention Object ID of the Talk that was viewed. |
| UserID | Varchar | 40 | The system, method, and apparatus of the invention Object ID of the User that viewed the talk. |
| UserName | Varchar | 256 | The Name corresponding to UserID (references EIndex.FieldValue where EIndex.FieldName='Name') |
| EloTalkID | Varchar | 16 | The Eloquent Talk ID (references EViewings.EloTalkID). |
| TalkName | Varchar | 256 | The Name corresponding to Object ID (references EIndex.FieldValue where EIndex.FieldName='Name'). |
| EventID | varchar | 40 | The system, method, and apparatus of the invention Object ID of the Event that contains the talk (references EIndex.FieldValue where EIndex.FieldName='ParentID') |
| EventName | Varchar | 256 | The Name corresponding to EventID (references EIndex.FieldValue where EIndex.FieldName='SourceEvent') |
| OpenTime | Datetime | | The date and time the talk was opened. |
| CloseTime | Datetime | | The date and time the talk was closed. |
| ClientAddress | Varchar | 255 | The IP address of the client that viewed the talk. |
| NumQuestions | Int | | The number of total questions in the quiz. |
| NumWithAnswers | Int | | The number of questions in the quiz that define a correct answer. |
| Grade | Int | | A grade computed as the number of correctly answered questions divided by NumQuestions times a hundred. For example, if half the questions were answered correctly, Grade would have a value of 50. |

Stored Procedures and Functions

Stored procedures are used in the system, method, and apparatus of the invention to isolate database-specific constructs (such as SQL7 identity vs. Oracle sequence), or to group statements in order to minimize roundtrips between our code and the database system.

Procedure: insert_audit_record
Insert a new record into EAudit. If necessary, a new record will also be inserted into EBrowserAgent.
Return: the system-generated ID of the new record (EAudit.AuditID).

| Parameter Name | Datatype | Length | Description |
| --- | --- | --- | --- |
| objectID | Varchar | 40 | The system, method, and apparatus of the invention Object ID of the object being audited. |
| objectName | Varchar | 40 | The name of the object corresponding to objected. |
| targetID | Varchar | 40 | The ObjectID of a secondary object that was involved in the audit event. |
| userID | Varchar | 40 | The system, method, and apparatus of the invention Object ID of the user performing the action. |
| auditAction | Varchar | 32 | A short string representing the action that was audited, such as login, open, delete, etc. A list of these strings is in EAudit.java. |
| detail | Varchar | 255 | Additional detail information. |
| clientAddress | Varchar | 255 | The IP Address of the client. |
| userAgent | Varchar | 255 | The client's user-agent. |

Procedure: inser_viewing_record
Insert a new record into Viewings. If necessary, a new record will also be inserted into EPlayerAgent.
Return: non.

| Parameter Name | Datatype | Length | Description |
| --- | --- | --- | --- |
| auditID | Integer | | The EAudit record that is associated with this viewing (references EAudit.AuditID). |
| eloTalkID | Varchar | 16 | The Eloquent Talk ID. |
| playerAgent | Varchar | 255 | The Player's agent string. |
| openTime | Datetime | | The date and time the talk was opened. |
| closeTime | Datetime | | The date and time the talk was closed. |
| clientAddress | Varchar | 255 | The IP Address of the client. |
| bytesSent | Integer | | The number of bytes streamed from the media server to the client. |
| flags | Integer | | Bit mask that represents viewing attributes. |
| completionCode | Integer | | Zero = successful Non-zero = failed |
| talkPercent | Integer | | The percentage of the talk that was viewed. |
| slidesPercent | Integer | | The percentage of the slides that were viewed. |
| duration | integer | | The amount of time spent viewing. |
| ConnectTime | Integer | | The difference between OpenTime and CloseTime, expressed in number of seconds. |
| Kbps | Integer | | The bandwidth used by this viewing, as expressed in kilobits per second. |

Procedure: insert_quiz_response_record
Insert a new record into EQuizResponse. If necessary, a new record will also be inserted into EPlayerAgent.
Return: the system-generated ID of the new record (EAudit.AuditID).

| Parameter Name | Datatype | Length | Description |
| --- | --- | --- | --- |
| auditID | integer | | The EAudit record that is associated with this quiz response (references EAudit.AuditID). |
| eloTalkID | varchar | 16 | The Eloquent Talk ID. |
| playerAgent | varchar | 255 | The Player's agent string. |
| openTime | datetime | | The date and time the talk was opened. |
| closeTime | datetime | | The date and time the talk was closed. |
| clientAddress | varchar | 255 | The IP Address of the client. |
| bytesSent | integer | | The number of bytes streamed from the media server to the client. |
| flags | integer | | Bit mask that represents viewing attributes. |
| completionCode | integer | | Zero = successful Non-zero = failed |
| numQuestions | integer | | The number of total questions in the quiz. |
| numWithAnswers | integer | | The number of questions in the quiz that define a correct answer. |
| grade | integer | | The grade for this quiz response. |

Procedure: insert_raw_audit_record
Insert a new record into EAudit. This procedure differs from insert_audit_record in that it allows the programmer to sepcify an audit date, rather than using the current server date and time, and it requires the user agent to be specified as an index into EBrowserAgent, rather than as a string. This procedure is used only when importing audit records from an ECP 5.0 installation.
Return: the system-generated ID of the new record (EAudit.AuditID).

| Parameter Name | Datatype | Length | Description |
| --- | --- | --- | --- |
| objectID | varchar | 40 | The system, method, and apparatus of the invention Object ID of the object being audited. |
| objectName | varchar | 40 | The name of the object corresponding to objected. |
| targetID | varchar | 40 | The ObjectID of a secondary object that was involved in the audit event. |
| userID | varchar | 40 | The system, method, and apparatus of the invention Object ID of the user performing the action. |
| auditAction | varchar | 32 | A short string representing the action that was audited, such as login, open, delete, etc. A list of these strings is in EAudit.java. |
| auditDate | DateTime | | The date the audit event occurred. |
| detail | varchar | 255 | Additional detail information. |
| clientAddress | varchar | 255 | The IP Address of the client. |
| userAgent | integer | | The client's user-agent of the original audit event, specified as a reference to EBrowserAgent.BrowserID. |

-continued

| | Procedure: insert_browser_agent_record Insert a new record into EBrowserAgent. This procedure is used only when importing audit records from an ECP 5.0 installation. Return: the system-generated ID of the new record (EBrowserAgent.BrowserID). | | |
|---|---|---|---|
| Parameter Name | Datatype | Length | Description |
| browserAgent | varchar | 255 | The HTTP user agent string. |

| | Procedure: insert_player_agent_record Insert a new record into EPlayerAgent. This procedure is used only when importing audit records from an ECP 5.0 installation. Return: the system-generated ID of the new record (EPlayerAgent.PlayerID). | | |
|---|---|---|---|
| Parameter Name | Datatype | Length | Description |
| browserAgent | varchar | 255 | The Eloquent player agent string. |

The Table "Objects" stores object definitions as a blob of XML data, including the ObjectID of the object, the version of the object, and the XML object definition. The table Eindex stores selected attributes for each object, including the ObjectID of the object, the attribute nbame, and the attribute value. Eobjects is a persistent object store that contains entire object definition, while Eindex is an index of object attributes. Updating the Eindex table does not change the object definition. The Eindex table can be used to locate objects (including parent/child relationships). Examples of Eobjects include:

select ObjectBlob from EObjects where ObjectID='1'

```
<Library>
    <ID>1</ID>
    <Name>ECS Library</Name>
    <Permissions_ SIZE="2">
        <Permissions KEY="5">1</Permissions>
        <Permissions KEY="0">1</Permissions>
    </Permissions_>
    <DateCreated>2000/06/28 20:12:28 GMT</DateCreated>
    <DateModified>2000/06/28 20:12:28 GMT</DateModified>
    <WhoModified>11</WhoModified>
    <WhoCreated>11</WhoCreated>
    <Version>1</Version>
    <MimeType>object/library</MimeType>
    <TimepointEnabled>false</TimepointEnabled>
    <Author></Author>
    <Organization></Organization>
    <Abstract></Abstract>
    <GeneratedAbstract></GeneratedAbstract>
</Library>
``` while an example of Eobjects is select FieldName, FieldValue from EIndex where ObjectID='1'

| FieldName | FieldValue |
|---|---|
| AttachedID | [null] |
| Author | |
| ContentDate | [null] |
| DateCreated | 2000/06/28 20:12:28 GMT |
| DateModified | 2000/06/28 20:12:28 GMT |
| ID | 1 |
| LastModified | [null] |
| MimeType | object/library |
| Name | ECS Library |
| Organization | |
| ParentID | [null] |
| Permissions | 0 |
| Permissions | 5 |
| Type | Library |
| WhoCreated | 11 |
| WhoModified | 11 |

The table: Esystem stores database and system properties, such as system keys and system values.

The table EAudit stores a record of system activity, such as AuditID, Object ID, ObjectName, TargetID, and UserID, where Audit ID is the unique ID of an audit record, ObjectID is the ID of the Object that was accesed, ObjectName is the name of the object corresponding to the ObjectID, the TargetID is the ObjectID of a secondary object involved in the audit event, and UserID is the ID of the User that accessed the object. AuditAction is a short string representing the action that was audited, such as a login, open, delete, etc. AuditDate is the date and time of the audit event. Detail is a text block for additional detail. ClientAddress is the IP address of the client, if any, initiating the request, while UserAgent is the User-Agent of the client initiating the request.

The Table EbrowserAgent stores the name of browser user-agents, including BrowserID, the unique ID of the record, and BrowserAgent, the name of the HTTP user-agent. Likewise, the table EplayerAgent stores the names of player clients, including PlayerID and PlayerAgent, the player's unique ID and name.

The Table: Eviewings Stores information about talk viewings. including the AuditID (a reference to the Eaudit record that corresponds to the talk, EloTalkID is the ID of the talk that was viewed, and PlayerAgentID is the name of the PlayerAgent that was used to view the talk. OpenTime and Close Time are the times the talk was opened and closed. ClientAddress is the IP address of the client that viewed the talk, BytesSent is the number of bytes streamed from the media server to the client, Flags is a bit mask that represents viewing attributed.

Views aggregate information for reporting and isolate database-specific constructs, such as EusageView (for Eaudit, Eviewings, and Eindex) and EquizResponseView (Eaudit, EquizResponses, EquizAnswers, and Eindex).

The method, system, and apparatus of our invention is further characterized by the use of stored procedures. Stored procedures provide more efficient processing, isolate database-specific constructs (especially IDENTITY vs. Sequence), and allow for such functions as insert_audit_record, insert_viewing_record, and insert_quiz_response_record.

The method, system, and apparatus of our invention utilizes various off the shelf and commercially available database tools (SQL7), such as Microsoft SQL Server 7, Enterprise Manager (to examine schema, examine data, and backup and restore), as well as Query Analyzer execute SQL statements, and Profiler to trace all database activity.

Oracle database tools are also used, such as DBA Studio to examine schema, EXP, and IMP, as command line utilities for backup, restore, and SQL Worksheet and SQL Plus to execute SQL statements.

Sybase Database Tools are also used, such as Sybase Central to provide access to other tools and utilities, and Interactive SQL to execute SQL statements and start a database server.

What is claimed is:

1. A method for sharing multimedia presentations among a group of participants, comprising:
   providing rich media files comprising a plurality of different types of rich media;
   storing the rich media files in a searchable database as dynamic rich media objects that are defined in accordance with an object data model having a plurality of predefined object attribute fields for rich media presentations, wherein the object data model supports a plurality of queries used to search and retrieve stored dynamic rich media objects based on data contents of the plurality of predefined object attribute fields for each dynamic rich media object, wherein the predefined object attribute fields are defined to include:
      an object identifier field for storing an object identifier that identifies a corresponding dynamic rich media object,
      a start-time field for storing a start time attribute for the corresponding dynamic rich media object;
      a participant-access control permission key field for storing participant-access control permission keys for the corresponding dynamic rich media object;
      one or more participant-progress tracking fields that store a tracking attribute that identifies a participant's personal progress in viewing the corresponding dynamic rich media object, and
      one or more participant input fields that store participant inputs that are received in response to participant interaction with the corresponding dynamic rich media object;
   creating a rich media presentation by associating a group of the dynamic rich media objects with an identifier for the presentation and one or more participant access control permission keys;
   providing a participant interface for selectively requesting to view the presentation, and for receiving input from a participant in the group of participants in connection with one or more dynamic rich media objects when presented to the participant as part of the presentation;
   in response to a request to view the presentation, automatically assembling a plurality of the dynamic rich media objects in real time on a server so that the dynamic rich media objects are displayed on the basis of the start-time attribute of each dynamic rich media object, wherein the server distributes to a requesting participant a version of the rich media presentation that dynamically varies in response to the participant-access control-permission keys and one or more participant-progress tracking attributes related to the requesting participant; and
   storing participant-progress tracking and participant input in the database when the requesting participant has viewed at least a portion of one or more of the dynamic rich media objects in the presentation,
   whereby when one of the participant's requests to view the presentation after watching at least a portion of one or more of the dynamic rich media objects in the presentation, a percentage of the multimedia presentation viewed by a requesting participant is computed.

2. A method as recited in claim 1 further comprising providing an editing tool for at least one participant to modify the dynamic rich media objects.

3. A method as recited in claim 1, wherein the storing comprises storing object attributes in XML for a plurality of the dynamic rich media objects.

4. A method as recited in claim 1 wherein each dynamic rich media object includes a start time and stop time for that dynamic rich media object.

5. A method as recited in claim 1 wherein the rich media presentation includes at least one dynamic rich media object selected from a plurality of dynamic rich media objects that differ from each other only in their format characteristics.

6. A method as recited in claim 5 wherein the dynamic rich media objects have format characteristics that include at least player type and bandwidth.

7. A method as recited in claim 1 wherein the rich media presentation includes at least one dynamic rich media object selected based on participant profiling.

8. A method as recited in claim 7, in which participant profiling includes permission levels.

9. A method as recited in claim 7, in which participant profiling includes system attributes.

10. A method as recited in claim 9, in which system attributes are selected from the group comprising bandwidth and player type.

11. A method as recited in claim 1 further comprising providing a search engine for searching the attribute fields of the dynamic rich media objects associated with the rich media presentation.

12. A method as recited in claim 1 wherein the participant input field stores information in a form of a quiz response.

13. A method as recited in claim 1 further comprising generating a usage report based on the attributes of the dynamic objects of the rich media presentation.

14. A method as recited in claim 1 wherein the object attribute fields further comprises a quiz success status field.

15. The method of claim 1 wherein participant-progress tracking includes the number of bytes streamed from the server to the participant.

16. The method of claim 1 wherein the participant-progress tracking includes the percent of the presentation that was viewed.

17. The method of claim 1 wherein the participant-progress tracking includes the percentage of slides that were viewed.

18. The method of claim 1 further comprising configuring the multi-media presentation to include one or more mandatory components.

19. The method of claim 18 wherein the mandatory component is a quiz.

20. The method of claim 18 wherein the mandatory component is whether a view has read a document.

21. The method of claim 18 wherein the mandatory component is a quiz.

22. The method of claim 18 wherein the mandatory component is whether a view has read a document.

23. A system for delivering presentations to network connected participants of the presentation, comprising:
   a server configured to:
      receive rich media files comprising a plurality of different types of rich media store the rich media files in a searchable database as dynamic rich media objects that are defined in accordance with an object data model having a plurality of predefined object attribute fields for rich media presentations, wherein the object data model supports a plurality of queries used to search and retrieve stored dynamic rich media objects based on data contents of the plurality of predefined object attribute fields for each dynamic rich media, wherein the predefined object attribute fields are defined to include:
  an object identifier field for storing an object identifier that identifies a corresponding dynamic rich media object,
  a start-time field for storing a start time attribute for the corresponding dynamic rich media object;
  a participant-access control permission key field for storing participant-access control permission keys for the corresponding dynamic rich media object;
  one or more participant-progress tracking fields that store a tracking attribute that identifies a participant's personal progress in viewing the corresponding dynamic rich media object, and
  one or more participant input fields that store participant inputs that are received in response to participant interaction with the corresponding the dynamic rich media object;
create a rich media presentation by associating a group of the dynamic rich media objects with an identifier for the presentation and one or more participant-access control permission keys;
provide a participant interface for selectively requesting to view the presentation, and for receiving input from a participant in the group of participants in connection with one or more dynamic rich media objects when presented to the participant as part of the presentation;
in response to a request to view the presentation, automatically assemble a plurality of the dynamic rich media objects in real time so that the dynamic rich media objects are displayed on the basis of the start-time attribute of each dynamic rich media object wherein the server distributes to a requesting participant a version of the rich media presentation that dynamically varies in response to the participant-access control permission keys and one or more participant-progress tracking attributes related to the requesting participant; and
store participant-progress tracking and participant inputs in the database when the requesting participant has viewed at least a portion of one or more of the dynamic rich media objects in the presentation,
whereby when one of the participant's requests to view the presentation after watching at least a portion of one or more of the dynamic rich media objects in the presentation, a percentage of the multimedia presentation viewed by a requesting participant is computed.

24. A system as recited in claim 23 wherein the server is configured to provide an editing tool for at least one participant to modify the dynamic rich media objects.

25. A system as recited in claim 23, wherein the server is configured to store object attributes in XML for a plurality of the dynamic rich media objects.

26. A system as recited in claim 23 wherein each dynamic object includes a start time and stop time for that dynamic rich media object.

27. A system as recited in claim 23 wherein the server stores the rich media presentation includes at least one dynamic rich media object selected from a plurality of dynamic rich media objects that differ from each other only in their format characteristics.

28. A system as recited in claim 27 wherein the dynamic rich media objects have format characteristics that include at least player type and bandwidth.

29. A system as recited in claim 23 wherein the rich media presentation includes at least one dynamic rich media object selected based on participant profiling.

30. A system as recited in claim 29, in which participant profiling includes permission levels.

31. A system as recited in claim 29, in which participant profiling includes system attributes.

32. A system as recited in claim 31, in which participant attributes are selected from the group comprising bandwidth and player type.

33. A system as recited in claim 23 wherein the server is configured to provide a search engine for searching the attribute field of the dynamic rich media objects associated with the rich media presentation.

34. A system as recited in claim 23 wherein the participant input field stores information in a form of a quiz response.

35. A system as recited in claim 23 wherein the server is further configured to generate a usage report based on the attributes of the dynamic objects of the rich media presentation.

36. A system as recited in claim 23 wherein the object attribute fields further comprises a quiz success status field.

37. The system of claim 23 wherein participant-progress tracking includes the number of bytes streamed from the server to the participant.

38. The system of claim 23 wherein the participant-progress tracking includes the percent of the presentation that was viewed.

39. The system of claim 23 wherein the participant-progress tracking includes the percentage of slides that were viewed.

40. The system of claim 23 wherein the system is further configured to specify one or more mandatory components of multi-media presentation.

41. The system of claim 40 wherein the mandatory component is a quiz.

42. The system of claim 40 wherein the mandatory component is whether a view has read a document.

43. A system for sharing a rich media presentation among a group of participants, comprising:
  means for providing rich media files comprising a plurality of different types of rich media;
  means for storing the rich media files in a searchable database as dynamic rich media objects that are defined in accordance with an object data model having a plurality of predefined object attribute fields for rich media presentations, wherein the object data model supports a plurality of queries used to search and retrieve stored dynamic rich media objects based on data contents of the plurality of predefined object attribute fields for each dynamic rich media object, wherein the predefined object attribute fields are defined to include:
    an object identifier field for storing an object identifier that identifies a corresponding dynamic rich media object,
    a start-time field for storing a start time attribute for the corresponding dynamic rich media object;
    a participant-access control permission key field for storing participant-access control permission keys for the corresponding dynamic rich media object;
    one or more participant-progress tracking fields that store a tracking attribute that identifies a participant's personal progress in viewing the corresponding dynamic rich media object, and
    one or more participant input fields that store participant inputs that are received in response to participant interaction with the corresponding dynamic rich media object;
  means for creating a rich media presentation by associating a group of the dynamic rich media objects with an identifier for the presentation and one or more participant access control permission keys;

means for providing a participant interface for selectively requesting to view the presentation, and for receiving input from a participant in the group of participants in connection with one or more dynamic rich media objects when presented to the participant as part of the presentation;

means for, in response to a request to view the presentation, automatically assembling a plurality of the dynamic rich media objects in real time on a server so that the dynamic rich media objects are displayed on the basis of the start-time attribute of each dynamic rich media object, wherein the server distributes to a requesting participant, a version of the rich media presentation that dynamically varies in response to the participant-access control permission keys and one or more participant-progress tracking attributes related to the requesting participant; and means for storing participant-progress tracking and participant input in the database when the requesting participant has viewed at least a portion of one or more of the dynamic rich media objects in the presentation, whereby when one of the participant's requests to view the presentation after watching at least a portion of one or more of the dynamic rich media objects in the presentation, a percentage of the multimedia presentation viewed by a requesting participant is computed.

44. A system as recited in claim 43 further comprising means for providing an editing tool for at least one participant to modify the dynamic rich media objects.

45. A system as recited in claim 43, wherein the means for storing comprises storing object attributes in XML for a plurality of the dynamic rich media objects.

46. A system as recited in claim 43 wherein each dynamic rich media object includes a start time and stop time for that dynamic rich media object.

47. A system as recited in claim 43 wherein the rich media presentation includes at least one dynamic rich media object selected from a plurality of dynamic rich media objects that differ from each other only in their format characteristics.

48. A system as recited in claim 47 wherein the dynamic rich media objects have format characteristics that include at least player type and bandwidth.

49. A system as recited in claim 43 wherein the rich media presentation includes at least one dynamic rich media object selected based on participant profiling.

50. A system as recited in claim 49, in which participant profiling includes permission levels.

51. A system as recited in claim 50, in which participant profiling includes system attributes.

52. A system as recited in claim 51, in which participant attributes are selected from the group comprising bandwidth and player type.

53. A system as recited in claim 43 further comprising means for providing a search engine for searching the attributes of the dynamic rich media objects associated with the rich media presentation.

54. A system as recited in claim 43 wherein the participant input field stores information in a form of a quiz response.

55. A system as recited in claim 43 further comprising a means for generating a usage report based on the attributes of the dynamic objects of the rich media presentation.

56. A system as recited in claim 43 wherein the object attribute fields further comprises a quiz success status field.

57. The system of claim 43 wherein participant-progress tracking includes the number of bytes streamed from the server to the participant.

58. The system of claim 43 wherein the participant-progress tracking includes the percent of the presentation that was viewed.

59. The system of claim 43 wherein the participant-progress tracking includes the percentage of slides that were viewed.

60. The system of claim 43 wherein the computer readable medium is further configured to specify one or more mandatory components of multi-media presentation.

* * * * *

UNITED STATES PATENT AND TRADEMARK OFFICE
CERTIFICATE OF CORRECTION

PATENT NO. : 7,627,810 B2 Page 1 of 1
APPLICATION NO. : 09/942161
DATED : December 1, 2009
INVENTOR(S) : Glazer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,627,810 B2  Page 1 of 1
APPLICATION NO. : 09/942161
DATED : December 1, 2009
INVENTOR(S) : Glazer et al.

It is certified that error appears in the above-identified patent and that said Letters Patent is hereby corrected as shown below:

Column 22:
Line 61 (claim 23), "types of rich media", start a new paragraph in line with the preceding paragraph "receive rich media files ...".

Signed and Sealed this

Seventeenth Day of April, 2012

David J. Kappos
*Director of the United States Patent and Trademark Office*